United States Patent
Hashimoto et al.

(10) Patent No.: US 9,800,874 B2
(45) Date of Patent: Oct. 24, 2017

(54) IMAGE DECODING APPARATUS EXECUTING SUCCESSIVE TILE DECODING AND FILTERING AROUND TILE BOUNDARY

(71) Applicant: Renesas Electronics Corporation, Kawasaki-shi, Kanagawa (JP)

(72) Inventors: Ryoji Hashimoto, Kanagawa (JP); Toshiyuki Kaya, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 473 days.

(21) Appl. No.: 14/304,943

(22) Filed: Jun. 15, 2014

(65) Prior Publication Data

US 2015/0003513 A1    Jan. 1, 2015

(30) Foreign Application Priority Data

Jun. 28, 2013   (JP) .................... 2013-135755

(51) Int. Cl.
*H04N 19/167*      (2014.01)
*H04N 19/176*      (2014.01)
(Continued)

(52) U.S. Cl.
CPC ......... *H04N 19/174* (2014.11); *H04N 19/117* (2014.11); *H04N 19/152* (2014.11);
(Continued)

(58) Field of Classification Search
CPC .. H04N 19/117; H04N 19/152; H04N 19/167; H04N 19/174; H04N 19/176;
(Continued)

(56) References Cited

U.S. PATENT DOCUMENTS 7,158,679 B2    1/2007  Sano et al.
9,078,000 B2    7/2015  Kazui et al.
(Continued)

FOREIGN PATENT DOCUMENTS

JP    2001-061066 A    3/2001
JP    2002-354501 A    12/2002
(Continued)

OTHER PUBLICATIONS

Extended European Search Report issued Oct. 31, 2014, in European Patent Application No. 14171167.1.
Office Action issued Dec. 15, 2016 in Japanese Patent Application No. 2013-135755.

*Primary Examiner* — Francis G Geroleo
(74) *Attorney, Agent, or Firm* — Shapiro, Gabor and Rosenberger, PLLC

(57) ABSTRACT

For a decoding apparatus based on H.265/HEVC with single-core or single-threaded hardware not parallelized, which executes decoding a plurality of tiles and filtering around a tile boundary, the disclosed invention is intended to reduce the frequency of access to decoded data around the boundaries between tiles stored in a frame memory for filtering such data or reduce the circuit size of a buffer that retains decoded data around the boundaries between tiles. The image decoding apparatus disclosed herein executes decoding and filtering in raster scan order across a screen independently of the sizes and positional relations of tiles. At a tile boundary, decoding proceeds to a right adjacent tile on the same row, rather than decoding coding blocks on one row down in the same tile, and filtering is also executed using decoded data of row-wise adjacent coding blocks.

7 Claims, 14 Drawing Sheets

(51) Int. Cl.
*H04N 19/152* (2014.01)
*H04N 19/117* (2014.01)
*H04N 19/174* (2014.01)
*H04N 19/44* (2014.01)
*H04N 19/467* (2014.01)
*H04N 19/80* (2014.01)
*H04N 19/33* (2014.01)
*H04N 19/423* (2014.01)

(52) U.S. Cl.
CPC ......... *H04N 19/167* (2014.11); *H04N 19/176* (2014.11); *H04N 19/33* (2014.11); *H04N 19/423* (2014.11); *H04N 19/44* (2014.11); *H04N 19/467* (2014.11); *H04N 19/80* (2014.11)

(58) Field of Classification Search
CPC ...... H04N 19/33; H04N 19/423; H04N 19/44; H04N 19/467; H04N 19/80
USPC .................................................... 375/240.02
See application file for complete search history.

(56) References Cited

U.S. PATENT DOCUMENTS

| | | |
|---|---|---|
| 2012/0183074 A1 | 7/2012 | Fuldseth |
| 2012/0230428 A1 | 9/2012 | Segall et al. |
| 2013/0076770 A1* | 3/2013 | Cheng ................... H04N 19/13 345/547 |
| 2014/0003525 A1* | 1/2014 | Fuldseth .............. H04N 19/176 375/240.16 |
| 2014/0037017 A1* | 2/2014 | Lin ...................... H04N 19/423 375/240.29 |
| 2016/0044323 A1 | 2/2016 | Sasaki et al. |

FOREIGN PATENT DOCUMENTS

| | | |
|---|---|---|
| JP | 2004-032799 A | 1/2004 |
| JP | 2013-012887 A | 1/2013 |
| JP | 2013-038758 A | 2/2013 |
| JP | 2013-098734 A | 5/2013 |
| WO | WO 2013-001755 A1 | 1/2013 |
| WO | WO 2013-008459 A1 | 1/2013 |
| WO | WO 2013/068498 A2 | 5/2013 |
| WO | WO 2014/156708 A1 | 10/2014 |

* cited by examiner

IMAGE DECODING APPARATUS EXECUTING SUCCESSIVE TILE DECODING AND FILTERING AROUND TILE BOUNDARY

CROSS-REFERENCE TO RELATED APPLICATIONS

The disclosure of Japanese Patent Application No. 2013-135755 filed on Jun. 28, 2013 including the specification, drawings and abstract is incorporated herein by reference in its entirety.

BACKGROUND

The present invention relates to an image decoding apparatus and can be used suitably, in particular, for an image decoding apparatus that receives bit streams coded using tiles in accordance with H.265 (HEVC: High Efficiency Video Coding).

As a next generation standard that follows H.264 (MPEG-4 AVC: Advanced Video Coding) which is a standardized image coding method, H.265/HEVC was approved by the International Telecommunication Union (ITU) and its standardization work is ongoing. In H.265/HEVC, coding with tiles is adopted as a type of coding tools. In H.265/HEVC, square pixel regions called CTBs (Coding Tree Blocks) which are units of coding and decoding are defined. In tile-based coding, a single image (one frame of image) is divided into a plurality of rectangular regions (these regions are called tiles or "blocks"), each of which is made up of a plurality of CTBs, coding is then performed independently for each region (tile), and coded results are combined into a single bit stream which is then output. At a decoding side to which a bit stream is input, reversely, decoding is performed for each region (tile) and decoded results are combined to restore one frame of image. Filtering is performed on data around the boundaries between tiles in order to prevent degradation in image quality, i.e., visible boundary lines.

Tile-based coding and decoding are appropriate for parallel processing. The reason for this is because it is possible to code image data independently for each tile and decode coded image data independently for each tile. In the case of multi-core software decoding with a plurality of parallel CPUs (Central Processing Units), parallel decoding can be performed with runs as many as the number of cores by assigning each tile to each CPU in executing tile decoding. In this process, all information obtained by tile decoding is stored into a memory. After decoding all tiles, filtering is performed on image data around the boundaries between tiles, using information stored in the memory; then, decoding of a single image (one frame of image) is completed.

A bit stream which has been coded by tile-based coding and transmitted needs to be always decoded by tile-based decoding. However, even if a transmitting end has a parallel hardware architecture fit for tile-based coding, a receiving end that performs decoding does not necessarily have similar parallel hardware architecture. Besides, a decoding apparatus that cannot identify what coding algorithm is applied by a coding apparatus needs to be configured such that it is capable of decoding bit streams coded by any coding algorithm. For instance, a decoding apparatus needs to be configured such that it is capable of decoding bit streams coded using tile-based coding as well as bit streams coded without using tile-based coding. In a case where a decoding apparatus employs multi-cores, such problems would arise that control becomes complicated to absorb a difference in degree of parallelism with respect to the coding side; and that, in an extreme case, one of the multiple CPUs can only be assigned to run effectively for decoding a bit stream for one frame coded with one tile. Hence, in most cases, a decoding apparatus has single-core or single-threaded hardware not parallelized and is configured to execute decoding of a plurality of tiles serially on a per-tile basis.

Patent Documents 1 and 2 disclose an image coding apparatus and method and an image decoding apparatus and method, which are based on the H.265/HEVC standard. A technique described in Patent Document 1 optimizes a quantization matrix in a case where there is a plurality of orders of scanning quantization coefficients within a block (tile). A technique described in Patent Document 2 optimizes a quantization matrix even if blocks (tiles) have a non-square shape. In each case, coding and decoding are performed for each of blocks (tiles) into which an image is divided by a block division unit.

Meanwhile, in the case of dividing a single image (one frame of image) into a plurality of regions such as tiles and coding and decoding the tiles, there is a problem in which tile boundary lines are made visible as unnatural lines and perceived as degradation in image quality.

Patent Documents 3 and 4 disclose an image processing technique for alleviating the appearance of tile boundary lines. An image compression and expansion apparatus described in Patent Document 3, when processing a still image having a plurality of components, changes the positions of tile boundaries for each component, thereby making the boundary lines unnoticeable when combined in an overlaying manner. A moving image processing apparatus described in Patent Document 4 changes the positions of tile boundaries for each frame, thereby making the boundary lines unnoticeable when combined in an overlaying manner.

RELATED ART DOCUMENTS

Patent Documents

[Patent Document 1] Japanese Published Unexamined Patent Application No. 2013-012887
[Patent Document 2] Japanese Published Unexamined Patent Application No. 2013-038758
[Patent Document 3] Japanese Published Unexamined Patent Application No. 2002-354501
[Patent Document 4] Japanese Published Unexamined Patent Application No. 2004-032799

SUMMARY

The present inventors conducted examination on Patent Documents 1, 2, 3, and 4. As a result, it was found that new problems exist, as will be described below.

To address the problem in which tile boundary lines are made visible as unnatural lines and perceived as degradation in image quality in the case of dividing one frame of image into a plurality of tiles and coding and decoding the tiles, a method is adopted that filters data around the boundaries of the tiles after decoding, besides the techniques disclosed in Patent Documents 3 and 4 mentioned previously. Filtering is a general method which is adopted also in the H.265/HEVC standard and does not require complicated control as in the techniques disclosed in Patent Documents 3 and 4 mentioned previously.

Filter processing requires adjoining image data as an input. If one frame of image is divided into a plurality of tiles, for each boundary between tiles, filter processing is executed after waiting until the completion of decoding of an adjacent tile. For each boundary between tiles, image output data of a tile that has been decoded earlier has to be retained by any method until decoding of a tile adjacent to that tile is completed. Two methods for retaining such data are possible. One method is to store decoded data resulting from decoding of each tile, for all tiles including tile boundaries, into a frame memory and, in filter processing, read and filter required decoded data around the boundaries between tiles and write filtered data back to the frame memory. Another method is to provide a buffer to retain decoded data around the boundaries between tiles, which is required for later filter processing, among decoded data resulting from decoding of each tile.

For a decoding apparatus having single-core or single-threaded hardware not parallelized and configured to execute decoding a plurality of tiles serially on a per-tile basis, there is a problem of reducing the frequency of access to decoded data around the boundaries between tiles stored in the frame memory for filtering such data or reducing the circuit size of a buffer that retains decoded data around the boundaries between tiles.

Means for solving such a problem are described below. Other problems and new features will become apparent from the following description in the present specification and the accompanying drawings.

According to one embodiment, there is provided an image decoding apparatus as below.

The image decoding apparatus executes decoding and filtering in raster scan order across a screen independently of the sizes and positional relations of tiles.

An advantageous effect that will be achieved by the foregoing one embodiment is briefly described below.

It is possible to reduce the frequency of access to decoded data around the boundaries between tiles in the frame memory for filtering such data or reducing the circuit size of a buffer that retains decoded data around the boundaries between tiles.

DETAILED DESCRIPTION

1. General Outline of Embodiments

Figure 1:
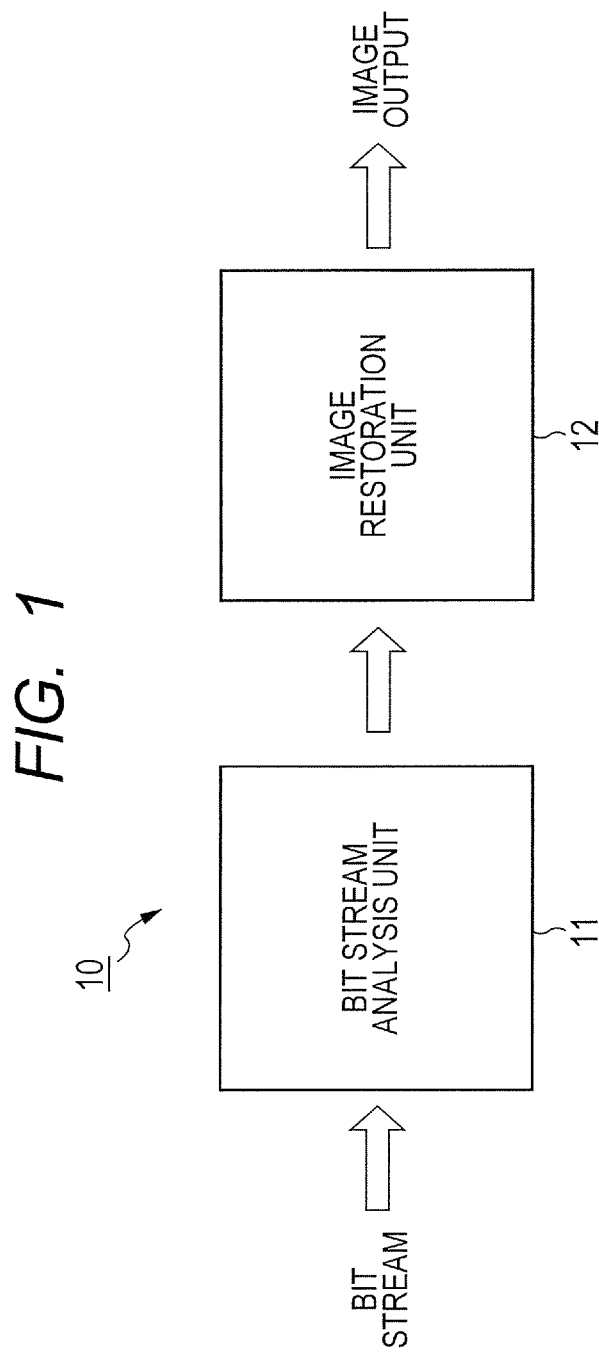
FIG. 1 is a block diagram depicting a configuration of an image decoding apparatus pertaining to a first embodiment.

To begin with, exemplary embodiments of the present invention disclosed herein are outlined. In the following general description of exemplary embodiments, reference designators (numerals) in the drawings, which are given for referential purposes in parentheses, are only illustrative of elements that fall in the concepts of the components identified by the designators.

[1]< Decoding and Filtering in Raster Scan Order Across an Entire Image Independently of Tile Boundaries>

An image decoding apparatus (10) including: a bit stream analysis unit (11) to which a bit stream including header information and coded image data is input; and an image restoration unit (12) that executes decode processing on the coded image data which is supplied from the bit stream analysis unit and executes filter processing on decoded data resulting from the decode processing is configured as below.

The coded image data is image data obtained by dividing one frame of an original image into a plurality of tiles which are rectangular regions and coding each of the tiles, each of the tiles including one or more coding blocks (CTBs) which are units of coding, arranged in a matrix.

The bit stream includes the coded image data coded for each tile in order from a tile on the left end, top row within the one frame, going through a right adjacent tile in turn, followed by tiles on one row down from left to right sequentially, and up to the bottom row in the frame, and coded for each coding block in each tile in order from a coding block on the left end, top row within the tile, going through a right adjacent coding block in turn, followed by coding blocks on one row down from left to right sequentially, and up to the bottom row in the tile.

The header information includes size information of each tile.

The image restoration unit serially executes decoding coding blocks in order from a coding block on the left end, top row within the one frame, going through a right adjacent coding block in turn, followed by coding blocks on one row down from left to right sequentially, and up to the bottom row in the frame, independently of whether or not there is a tile boundary within the one frame, and filtering decoded image data around a boundary, if any, between horizontally adjoining tiles.

This implementation can eliminate the need for a buffer for tile boundary filtering which is used in filter processing around a boundary between two tiles adjoining horizontally to retain decoded results of a left-hand tile until filtering for a right-hand tile begins.

[2]< Bit Stream Analysis Unit and Data for Analysis>

The image decoding apparatus, as set forth in section [1], further includes a data buffer for data for analysis (2) which is accessible from the bit stream analysis unit.

The bit stream analysis unit calculates a location within the bit stream at which is stored a coding block placed at the beginning of each tile on a row now to be processed for restoration by the image restoration unit, based on the header information, and buffers that location into the data buffer for data for analysis.

The bit stream analysis unit reads corresponding image data from the bit stream on the row now to be processed for restoration by the image restoration unit, which is retained in the data buffer for data for analysis, and supplies that image data to the image restoration unit. The bit stream analysis unit performs the reading, based on the location within the bit stream at which is stored a coding block placed at the beginning of each tile.

This implementation can eliminate the need for the above-mentioned buffer for tile boundary filtering. The size of the data buffer for data for analysis which is needed instead can be reduced to be less than or equal to a fraction of the size of the buffer for tile boundary filtering.

[3]< Configuration of the Image Restoration Unit Under Section [2]>

The image decoding apparatus under section [2] further includes a frame buffer (7) for storing decoded images that are output from the image restoration unit.

The image restoration unit includes a predictive image generating unit (13), a differential image generating unit (14), an adder (15), a filter processing unit (16), a first buffer (5), and a second buffer (6).

The first buffer retains upper adjacent pixel information before being filtered, which is required for processing to generate a predictive image of a lower adjacent coding block to a coding block now being processed, among predictive image information that is output from the predictive image generating unit.

The predictive image generating unit generates a predictive image, based on predictive data comprised in the image data which is supplied from the bit stream analysis unit, the upper adjacent pixel information before being filtered, which is retained in the first buffer, and decoded pixel information which is stored in the frame buffer.

The differential image generating unit generates a differential image, based on residual data comprised in the image data which is supplied from the bit stream analysis unit.

The adder adds the predictive image and the differential image and generates a decoded image before being filtered.

The second buffer retains upper adjacent pixel information after being filtered, which is required for filter processing for a lower adjacent coding block to a coding block now being processed, among pixel information of a decoded image that is output from the filter processing unit.

The filter processing unit generates a decoded image, based on the decoded image before being filtered, which is supplied from the adder, and the upper adjacent pixel information after being filtered, which is retained in the second buffer, and outputs the decoded image from the image restoration unit.

In this way, the image restoration unit under section [2] can be configured favorably.

[4]<A Buffer Provided at the Input Side of the Image Restoration Unit and Data Size of Each Tile>

The image decoding apparatus, as set forth in section [1], further includes an image data buffer (3) that temporarily stores the coded image data which is output from the bit stream analysis unit and supplies that data to the image restoration unit.

The bit stream analysis unit outputs the image data to the image data buffer, following order in which image data is stored within the bit stream, calculates data size of each tile, based on the header information, and outputs the data size of each tile to the image restoration unit.

The image restoration unit calculates an address at which is stored image data now to be processed for decoding, based on the data size of each tile, reads the image data from the image data buffer, and decodes that image data.

This implementation can make the order in which to read and input image data to the image restoration unit conforming to the order in which coding blocks are to be processed, as set forth in section [1], instead of using the data buffer for data for analysis (2) under sections [2] and [3].

[5]< Configuration of the Image Restoration Unit Under Section [4]>

The image decoding apparatus under section [4] further includes a frame buffer (7) for storing decoded images that are output from the image restoration unit.

The image restoration unit includes a data read unit (17), an in-buffer location information storing unit (18), a predictive image generating unit (13), a differential image generating unit (14), an adder (15), a filter processing unit (16), a first buffer (5), and a second buffer (6).

The in-buffer location information storing unit retains the address at which is stored image data now to be processed for decoding, which is determined, based on the data size of each tile.

The data read unit reads image data from the image data buffer according to the address stored in the in-buffer location information storing unit, supplies predictive data comprised in the read image data to the predictive image generating unit, and supplies residual data comprised in the read image data to the differential image generating unit.

The first buffer retains upper adjacent pixel information before being filtered, which is required for processing to generate a predictive image of a lower adjacent coding block to a coding block now being processed, among predictive image information that is output from the predictive image generating unit.

The predictive image generating unit generates a predictive image, based on the predictive data which is supplied from the data read unit, the upper adjacent pixel information before being filtered, which is retained in the first buffer, and decoded pixel information which is stored in the frame buffer.

The differential image generating unit generates a differential image, based on the residual data which is supplied from the data read unit.

The adder adds the predictive image and the differential image and generates a decoded image before being filtered.

The second buffer retains upper adjacent pixel information after being filtered, which is required for filter processing for a lower adjacent coding block to a coding block now being processed, among pixel information of a decoded image that is output from the filter processing unit.

The filter processing unit generates a decoded image, based on the decoded image before being filtered, which is supplied from the adder, and the upper adjacent pixel information after being filtered, which is retained in the second buffer, and outputs the decoded image from the image restoration unit.

In this way, the image restoration unit under section [4] can be configured favorably.

[6]< Buffers for Respective Tiles Provided at the Input Side of the Image Restoration Unit>

The image decoding apparatus, as set forth in section [1], further includes a plurality of image data buffers (4_1, 4_2, 4_3, ... ) that temporarily store the coded image data which is output from the bit stream analysis unit.

The image data buffers are used respectively for a plurality of tiles now to be processed for decoding.

The bit stream analysis unit outputs image data for a tile to one of the image data buffers appropriate for that tile.

The image restoration unit reads image data from one of the image data buffers in which is stored image data now to be processed for decoding and decodes that image data.

This implementation can make the order in which to read and input image data to the image restoration unit conforming to the order in which coding blocks are to be processed, as set forth in section [1].

[7]< Configuration of the Image Restoration Unit Under Section [6]>

The image decoding apparatus under section [6] further includes a frame buffer (7) for storing decoded images that are output from the image restoration unit.

The image restoration unit includes a data read unit (17), an in-buffer location information storing unit (18), a predictive image generating unit (13), a differential image generating unit (14), an adder (15), a filter processing unit (16), a first buffer (5), and a second buffer (6).

The in-buffer location information storing unit retains an address at which is stored next image data now to be processed for decoding, which is determined, based on how much image data for each tile has already been read.

The data read unit reads image data from one of the image data buffers used for a tile to which image data now to be processed for decoding belongs, according to the address stored in the in-buffer location information storing unit, supplies predictive data comprised in the read image data to the predictive image generating unit, and supplies residual data comprised in the read image data to the differential image generating unit.

The first buffer retains upper adjacent pixel information before being filtered, which is required for processing to generate a predictive image of a lower adjacent coding block to a coding block now being processed, among predictive image information that is output from the predictive image generating unit.

The predictive image generating unit generates a predictive image, based on the predictive data which is supplied from the data read unit, the upper adjacent pixel information before being filtered, which is retained in the first buffer, and decoded pixel information which is stored in the frame buffer.

The differential image generating unit generates a differential image, based on the residual data which is supplied from the data read unit, The adder adds the predictive image and the differential image and generates a decoded image before being filtered.

The second buffer retains upper adjacent pixel information after being filtered, which is required for filter processing for a lower adjacent coding block to a coding block now being processed, among pixel information of a decoded image that is output from the filter processing unit.

The filter processing unit generates a decoded image, based on the decoded image before being filtered, which is supplied from the adder, and the upper adjacent pixel information after being filtered, which is retained in the second buffer, and outputs the decoded image from the image restoration unit.

In this way, the image restoration unit under section [6] can be configured favorably.

[8]<A Buffer for Storing Fixed-Length Data Provided at the Input Side of the Image Restoration Unit>

The image decoding apparatus, as set forth in section [1], further includes an image data buffer (3) that temporarily stores the coded image data which is output from the bit stream analysis unit and supplies that data to the image restoration unit.

The bit stream analysis unit converts data size of each tile of image data to data size of a given fixed length, following order in which image data is stored within the bit stream, and outputs image data of fixed length to the image data buffer.

The image restoration unit calculates an address at which is stored image data now to be processed for decoding, based on the data size of a given fixed length, reads the image data from the image data buffer according to the address, and decodes that image data.

This implementation can make the order in which to read and input image data to the image restoration unit conforming to the order in which coding blocks are to be processed, as set forth in section [1], instead of using the data buffer for data for analysis (2) under sections [2] and [3].

[9]< Configuration of the Image Restoration Unit Under Section [8]>

The image decoding apparatus under section [8] further includes a frame buffer (7) for storing decoded images that are output from the image restoration unit.

The image restoration unit includes a data read unit (17), an in-buffer location calculating unit (19), a predictive image generating unit (13), a differential image generating unit (14), an adder (15), a filter processing unit (16), a first buffer (5), and a second buffer (6).

The in-buffer location calculating unit calculates an address at which is stored image data now to be processed for decoding, based on the data size of a given fixed length.

The data read unit reads image data from the image data buffer according to the address calculated by the in-buffer location calculating unit, supplies predictive data comprised in the read image data to the predictive image generating unit, and supplies residual data comprised in the read image data to the differential image generating unit.

The first buffer retains upper adjacent pixel information before being filtered, which is required for processing to generate a predictive image of a lower adjacent coding block to a coding block now being processed, among predictive image information that is output from the predictive image generating unit.

The predictive image generating unit generates a predictive image, based on the predictive data which is supplied from the data read unit, the upper adjacent pixel information before being filtered, which is retained in the first buffer, and decoded pixel information which is stored in the frame buffer.

The differential image generating unit generates a differential image, based on the residual data which is supplied from the data read unit.

The adder adds the predictive image and the differential image and generates a decoded image before being filtered.

The second buffer retains upper adjacent pixel information after being filtered, which is required for filter processing for a lower adjacent coding block to a coding block now being processed, among pixel information of a decoded image that is output from the filter processing unit.

The filter processing unit outputs a decoded image, based on the decoded image before being filtered, which is supplied from the adder, and the upper adjacent pixel information after being filtered, which is retained in the second buffer.

In this way, the image restoration unit under section [8] can be configured favorably.

[10]< Decoding and Filtering in Raster Scan Order Across an Entire Image Independently of Tile Boundaries>

An image decoding apparatus (10) to which a bit stream including coded image data is input and which executes decode processing on the coded image data and executes filter processing on decoded data resulting from the decode processing is configured as below.

The coded image data is image data obtained by dividing one frame of an original image into a plurality of tiles which are rectangular regions and coding each of the tiles, each of the tiles including one or more coding blocks (CTBs) which are units of coding, arranged in a matrix.

The bit stream includes the coded image data coded for each tile in order from a tile on the left end, top row within the one frame, going through a right adjacent tile in turn, followed by tiles on one row down from left to right sequentially, and up to the bottom row in the frame, and coded for each coding block in each tile in order from a coding block on the left end, top row within the tile, going through a right adjacent coding block in turn, followed by coding blocks on one row down from left to right sequentially, and up to the bottom row in the tile.

The image restoration unit serially executes decoding coding blocks in order from a coding block on the left end, top row within the one frame, going through a right adjacent coding block in turn, followed by coding blocks on one row down from left to right sequentially, and up to the bottom row in the frame, independently of whether or not there is a tile boundary within the one frame, and filtering decoded image data around a boundary, if any, between horizontally adjoining tiles.

This implementation can eliminate the need for the buffer for tile boundary filtering which is used in filter processing around a boundary between two tiles adjoining horizontally to retain decoded results of a left-hand tile until filtering for a right-hand tile begins.

2. Details on Embodiments

Embodiments of the invention will then be described in greater detail.

First Embodiment <Decoding and Filtering in Raster Scan Order Across an Entire Image Independently of Tile Boundaries>

FIG. 1 is a block diagram depicting a configuration of an image decoding apparatus pertaining to a first embodiment.

The image decoding apparatus 10 is configured including a bit stream analysis unit 11 and an image restoration unit 12. The bit stream analysis unit 11 and the image restoration unit 12 are each a signal processing circuit with single-threaded hardware not parallelized, which is configured with, for example, but not limited to, digital logic circuits arranged in a pipeline configuration, which operate in sync with a clock. Although not restrictive, these units are formed over a single semiconductor substrate such as a silicon substrate using commonly known fabrication technology, e.g., CMOS (Complementary Metal-Oxide-Semiconductor field effect transistor) and LSI (Large Scale Integrated circuit).

To the bit stream analysis unit 11, a bit stream is input that includes header information and coded image data complying with, for example, but not limited to, the H.265/HEVC standard. The image restoration unit 12 decodes coded image data supplied from the bit stream analysis unit 11 and filters decoded data resulting from decoding.

Figure 2:
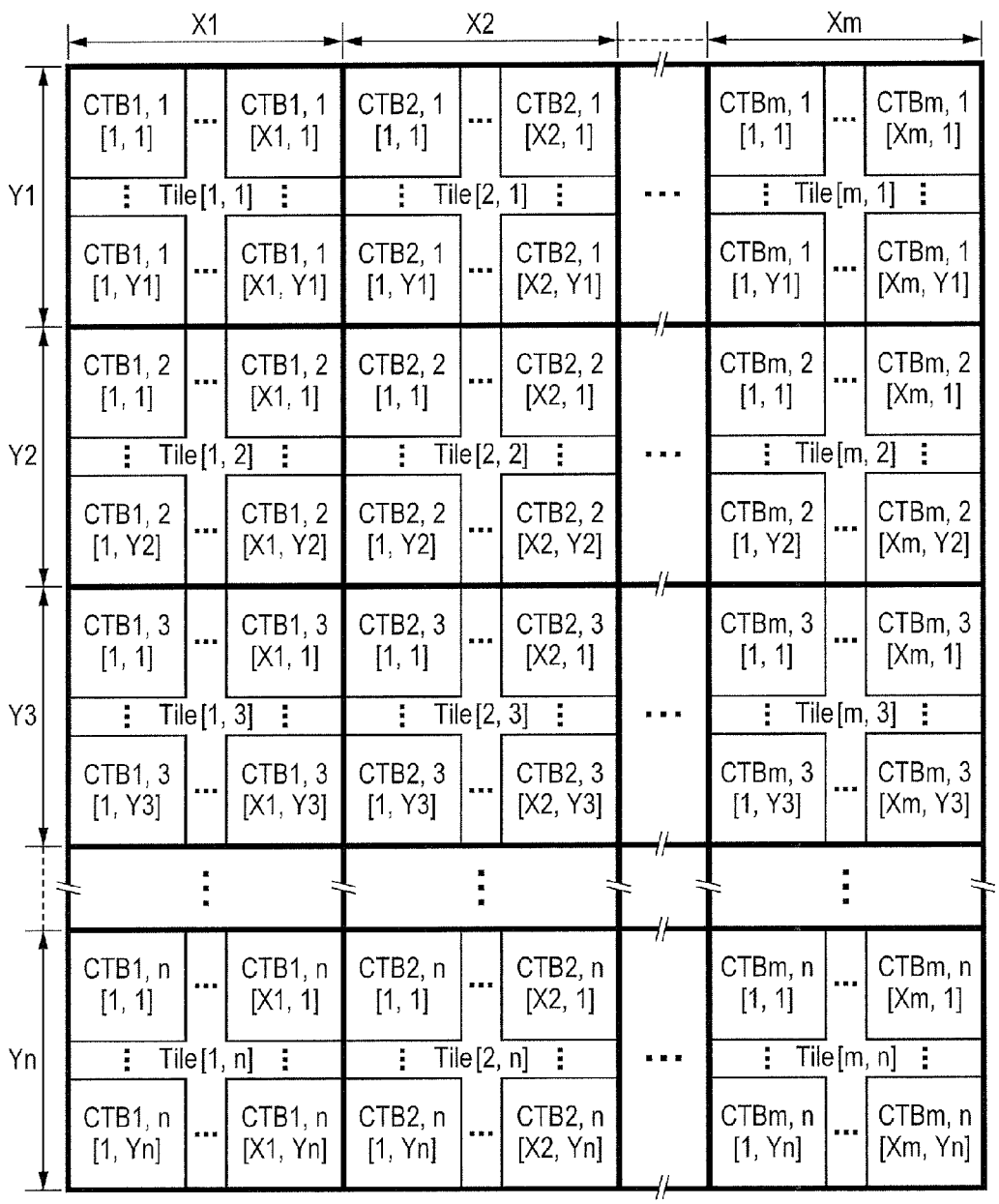
FIG. 2 is an explanatory diagram depicting an arrangement of tiles and CTBs in one frame of image.
Figure 3:
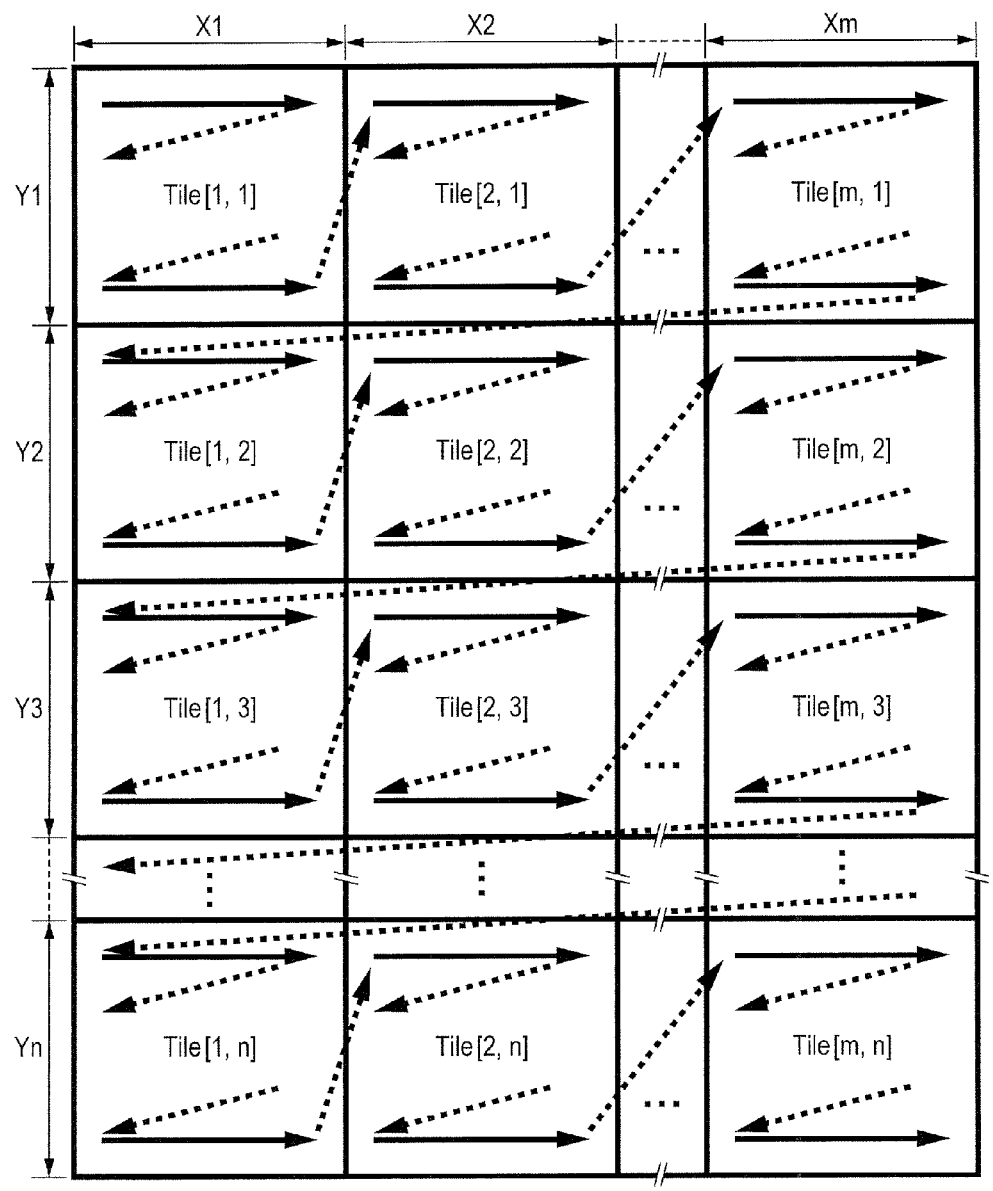
FIG. 3 is an explanatory diagram depicting an arrangement of tiles and CTBs in a bit stream.
Figure 4:
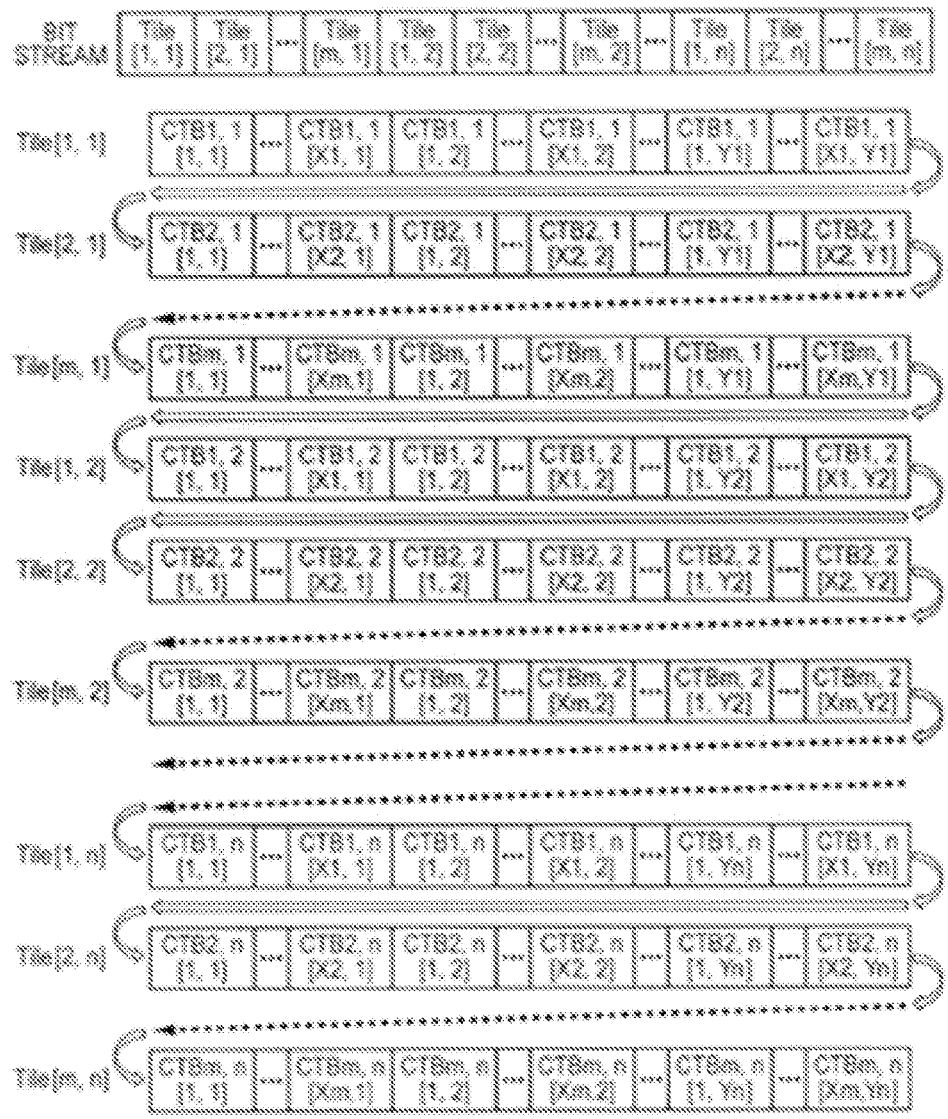
FIG. 4 is a more detailed explanatory diagram depicting an arrangement of tiles and CTBs in a bit stream.

FIG. 2 is an explanatory diagram depicting an arrangement of tiles and CTBs in one frame of image. FIG. 3 is an explanatory diagram depicting an arrangement of tiles and CTBs in a bit stream. Moreover, FIG. 4 is a more detailed explanatory diagram depicting an arrangement of tiles and CTBs in a bit stream. At the top of the diagram, an arrangement of tiles within a bit stream is represented, below which an arrangement of CTBs in each tile is represented.

According to the H.265/HEVC standard, coded image data is image data obtained by dividing one frame of an original image into a plurality of tiles which are rectangular regions and coding each of the tiles and each of the tiles includes one or more coding blocks (CTBs) which are units of coding, arranged in a matrix. As depicted in FIG. 2, one frame of image is divided into tiles in m columns and n rows and each type is comprised of a plurality of CTBs. X1 to Xm each represent the number of CTBs in columns that each tile includes and Y1 to Yn each represent the number of CTBs in rows that each tile includes. For example, a tile, Tile[1,1] on the left end, top row is comprised of CTBs in X1 columns and Y1 rows. Here, m, n, Z1 to Xm, and Y1 to Yn are each an integer of 1 or more. One frame may consist entirely of one column of tiles with no tile boundary in a horizontal direction. One frame may consist entirely of one row of tiles with no tile boundary in a vertical direction. Moreover, one frame may consist of only a single tile.

A bit stream includes image data coded for each tile in order from a tile on the left end, top row within one frame, going through a right adjacent tile in turn, followed by tiles on one row down from left to right sequentially, and up to the bottom row in the frame, and coded for each coding block in each tile in order from a coding block on the left end, top row within the tile, going through a right adjacent coding block in turn, followed by coding blocks on one row down from left to right sequentially, and up to the bottom row in the tile. Coded image data making up a bit stream, as depicted in FIG. 3, is comprised of a plurality of tiles that are arranged in order of raster scanning within a frame. That is, the raster scan begins with Tile[1,1] on the left end, top row, goes rightward through Tile[2,1] . . . up to Tile[m,1] on the right end in one frame, and then goes from Tile[1,2] to Tile[m,2] on one row down. Within each tile, coding blocks are further arranged in order of raster scanning. More particularly, as depicted in FIG. 4, in Tile[1,1] on the left end, top row, the raster scan begins with CTB1,1 [1,1] on the left end, top row, goes rightward up to CTB1,1 [X, 1] on the right end in the Tile[1,1], and then goes rightward from CTB1,1 [1, 2] on the next row in the same Tile[1,1] up to CTB1,1 [X1,2] on the right end. Upon completing CTB1,1 [1,Y1] thru CTB1,1 [X1,Y1] on the bottom row within the Tile[1,1], the raster scan goes to a right adjacent Tile[2,1]. Within the Tile[2,1], the raster scan goes in order from CTB2,1 [1,1] to CTB2,1 [X1,Y1]. Subsequently, the raster scan goes sequentially up to Tile[m,1] and then goes to Tile[1,2] thru Tile[m,2] on one row down. While repeating this, the raster scan goes to Tile[1,n] thru Tile[m,n] on the bottom row in one frame.

Image data coded for each CTB has a variable length. A bit stream includes image data coded as above and further includes header information. Header information includes size information of each tile.

Figure 5:
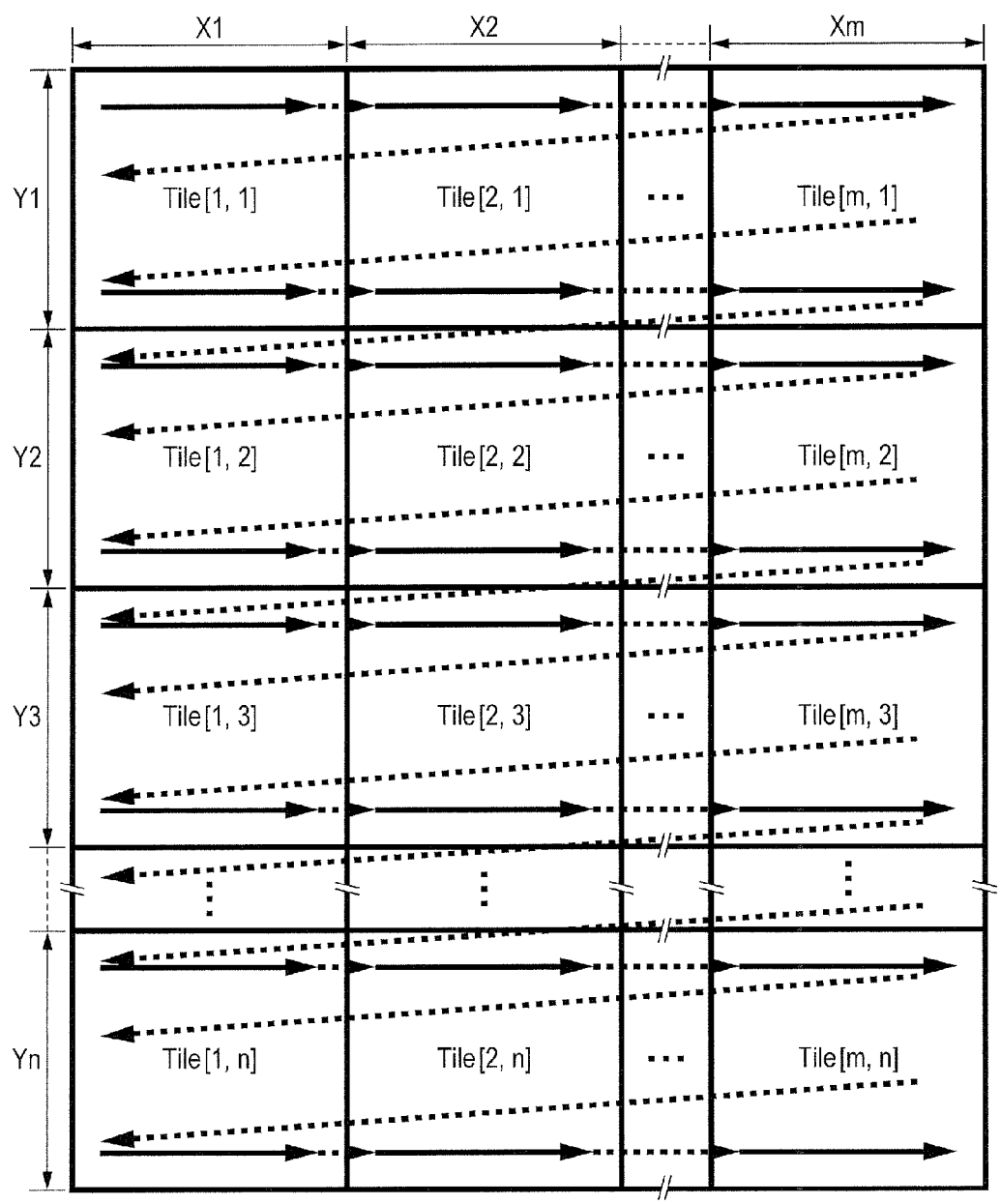
FIG. 5 is an explanatory diagram depicting an order in which tiles and CTBs are to be processed in the image decoding apparatus pertaining to the first embodiment (also applicable to other embodiments).
Figure 6:
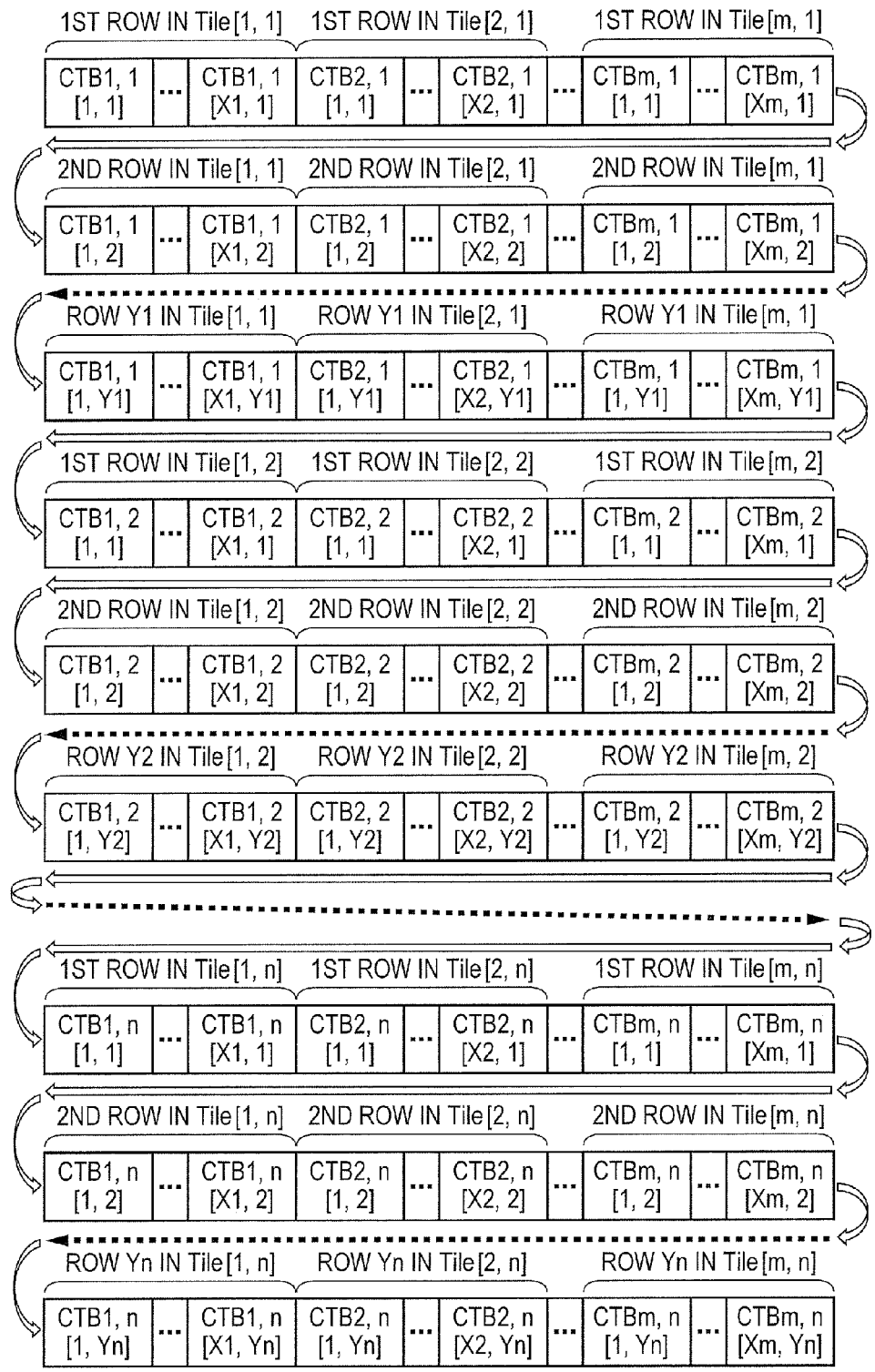
FIG. 6 is a more detailed explanatory diagram depicting an order in which tiles and CTBs are to be processed in the image decoding apparatus pertaining to the first embodiment (also applicable to other embodiments).

FIG. 5 is an explanatory diagram depicting an order in which tiles and CTBs are to be processed in the image decoding apparatus pertaining to the first embodiment (also applicable to other embodiments). FIG. 6 is a more detailed explanatory diagram depicting an order in which tiles and CTBs are to be processed in the image decoding apparatus pertaining to the first embodiment (also applicable to other embodiments).

The image restoration unit 12 serially executes decoding coding blocks (CTBs) in order from a coding block (CTB) on the left end, top row within one frame, going through a right adjacent coding block (CTB) in turn, followed by coding blocks (CTBs) on one row down from left to right sequentially, and up to the bottom row in the frame, independently of whether or not there is a tile boundary within one frame, and filtering decoded image data around a boundary, if any, between horizontally adjoining tiles.

A bit stream includes image data coded within a tile in raster scan order within the range of each tile, as descried above, whereas the decode processing decodes coded image data in raster scan across a one-frame screen, ignoring tile boundaries, as depicted in FIG. 5. The image restoration unit 12 executes the decode processing on coded image data and the filter processing on decoded results. The decoded results are directly subjected to the filter processing without being transferred to an external frame buffer or the like. The image restoration unit 12 executes the decode processing and the filter processing on CTBs on a 1st row in Tile[1,1], a 1st row in Tile[2,1], and up to a 1st row in Tile[m,1] on the right end in one frame. Then, it executes the same processings on CTBs on one row down, i.e., a 2nd row in Tile[1,1], a 2nd row in Tile[2,1], and up to a 2nd row in Tile[m,1] on the right end in one frame; it executes the same processings serially row by row up to row Y1 in Tile[1,1], Tile[2,1], and up to Tile[m,1]. Subsequently, it executes the same processings serially row by row for 1st row thru row Y2 in Tile[1,2], Tile[2,2] thru Tile[m,2] and 1st row thru row Y3 in Tile[1,3], Tile[2,3] thru Tile[m,3], respectively. Subsequently, it further executes the same processings serially row by row for 1st row thru row Yn in Tile[1,n], Tile[2,n] thru Tile[m,n], respectively, which are the tiles on the bottom row in a one-frame screen. More particularly, as depicted in FIG. 6, the execution starts from CTB1,1 [1,1] on the left end, top row in Tile[1,1] on the left end, top row, goes rightward up to CTB1,1 [X1,1] on the right end in Tile[1,1]; then, enters a right adjacent Tile[2,1] and goes from CTB2,1 [1,1] on the left end, top row to CTB1,1 [X2,1] on the right end in Tile[2,1]. CTB1,1 [X1,1] on the right end in Tile[1,1] and CTB2,1 [1,1] the left end, top row in a right adjacent Tile[2,1] are successively subjected to the decoding processing on coded image data and the filter processing on decoded results executed by the image restoration unit 12. Subsequently, the execution further goes on for CTBs on the 1st row in a one-frame screen. After the execution up to CTB1,1 [Xm,1] on the right end in Tile[m,1] on the right end, top row, the execution proceeds to the 2nd row. On the 2nd row, again, the execution goes rightward from CTB1,1 [1,2] on the left end in Tile[1,1] to CTB1,1 [X1,2] on the right end, through CTB2,1 [1,2] thru CTB2,1 [X2,2] on the 2nd row in Tile[2,1], and up to CTBm,1 [Xm,2] on the right end. Subsequently, after the tiles on the top row are processed serially row by row for CTBs, the execution proceeds to processing on tiles on the 2nd row. Similarly for tiles on the 2nd row and subsequent, CTBs are processed serially row by row, independently of whether or not there is a tile boundary. For tiles on the 2nd row, Tile[1,2], Tile[2,2] thru Tile[m,2], the execution goes on for CTBs on the 1st row, CTB1,2 [1,1] thru CTB1,2 [X1,1], CTB2,2 [1,1] thru CTB2,2 [X2,1], and up to CTBm,2 [1,1] thru CTBm,2 [Xm,1]. The execution then goes on for CTBs on the 2nd row, CTB1,2 [1,2] thru CTB1,2 [X1,2], CTB2,2 [1,2] thru CTB2,2 [X2,2], and up to CTBm,2 [1,2] thru CTBm,2 [Xm,2]. The execution further goes on serially row by row up to CTBs on the bottom row Y2, CTB1,2 [1,Y2] thru CTB1,2 [X1,Y2], CTB2,2 [1,Y2] thru CTB2,2 [X2,Y2], and up to CTBm,2 [1, Y2] thru CTBm,2 [Xm,Y2]. Subsequently, the execution enters tiles on the bottom row, Tile[1,n], Tile[2,n] thru Tile[m,n] and goes on for CTBs on the 1st row, CTB1,n [1,1] thru CTB1,n [X1,1], CTB2,n [1,1] thru CTB2,n [X2,1], and CTBm,n [1,1] thru CTBm,n [Xm,1]. The execution further goes on for CTBs on the 2nd row, CTB1,n [1,2] thru CTB1,n [X1,2], CTB2,n [1,2] thru CTB2,n [X2,2], and CTBm,n [1,2] thru CTBm,n [Xm,2] and goes serially row by row up to CTBs on the bottom row, CTB1,n [1,Yn] thru CTB1,n [X1,Yn], CTB2,n [1,Yn] thru CTB2,n [X2,Yn], and CTBm,n [1,Yn] thru CTBm,n [Xm, Yn].

The decode processing is performed per coding block, whereas the filter processing requires adjoining pixel data. The filter processing on data around a tile boundary requires decoded results in an adjacent tile. When two tiles adjoin horizontally, decoded image data on the right edge of a left-hand tile that is processed earlier is used when the filter processing for a pixel on the left edge of a right-hand tile is executed. When two tiles adjoin vertically, decoded image data on the bottom edge of an upper tile that is processed earlier is used when the filtering process for a pixel on the top edge of a lower tile is executed. Decoded image data that is used for the filter processing with respect to tiles adjoining horizontally or vertically is not limited one pixel data on the tile edge (right edge or bottom edge); it may be data for a plurality of pixels according to the number of filter taps.

In a related art method in which decoding advances in the same order as the ordering of image data in a bit stream, the decode processing first decodes a tile, Tile[1,1] on the left end, top row, from 1st row and serially up to row Y1 and then proceeds to decoding of a right adjacent Tile[2,1]. The filter processing, after executed from 1st row and serially up to row Y1 in Tile[1,1], proceeds to filtering for the right adjacent Tile[2,1]. Decoded data of right end blocks from the 1st row and serially up to row Y1 in Tile[1,1] must be retained until filtering for the right adjacent Tile[2,1] begins. Therefore, an image restoration unit according to related art requires a buffer for tile boundary filtering, because, in filter processing around a boundary between two tiles adjoining horizontally, decoded results of a left-hand tile are to be retained until filtering for a right-hand tile begins. To avoid this, it is necessary to store decoded results of a left-hand tile once into, e.g., an external frame buffer and read them again when filtering for a right-hand tile has begun. In any case, it is necessary to retain decoded results of a left-hand tile by any method until filtering for a right-hand tile begins.

On the other hand, according to the present embodiment, decoding and filtering for one row are executed successively independently of whether or not there is a tile boundary. Thus, across a tile boundary, decoded results of a left-hand tile can be directly passed to the filter processing for a right-hand tile and, thus, there is no need for the above-mentioned buffer for tile boundary filtering. As regards a tile boundary in a vertical direction, a buffer for tile boundary filtering is needed also in the present embodiment as is the case in related art. Besides, according to the present embodiment, the amount of data to be transferred, which is required for tile boundary processing, can be reduced. Furthermore, because the filter processing can be assembled into decoding pipelines, enhanced performance can be achieved.

Second Embodiment <Bit Stream Analysis Unit and Data for Analysis>

Figure 7:
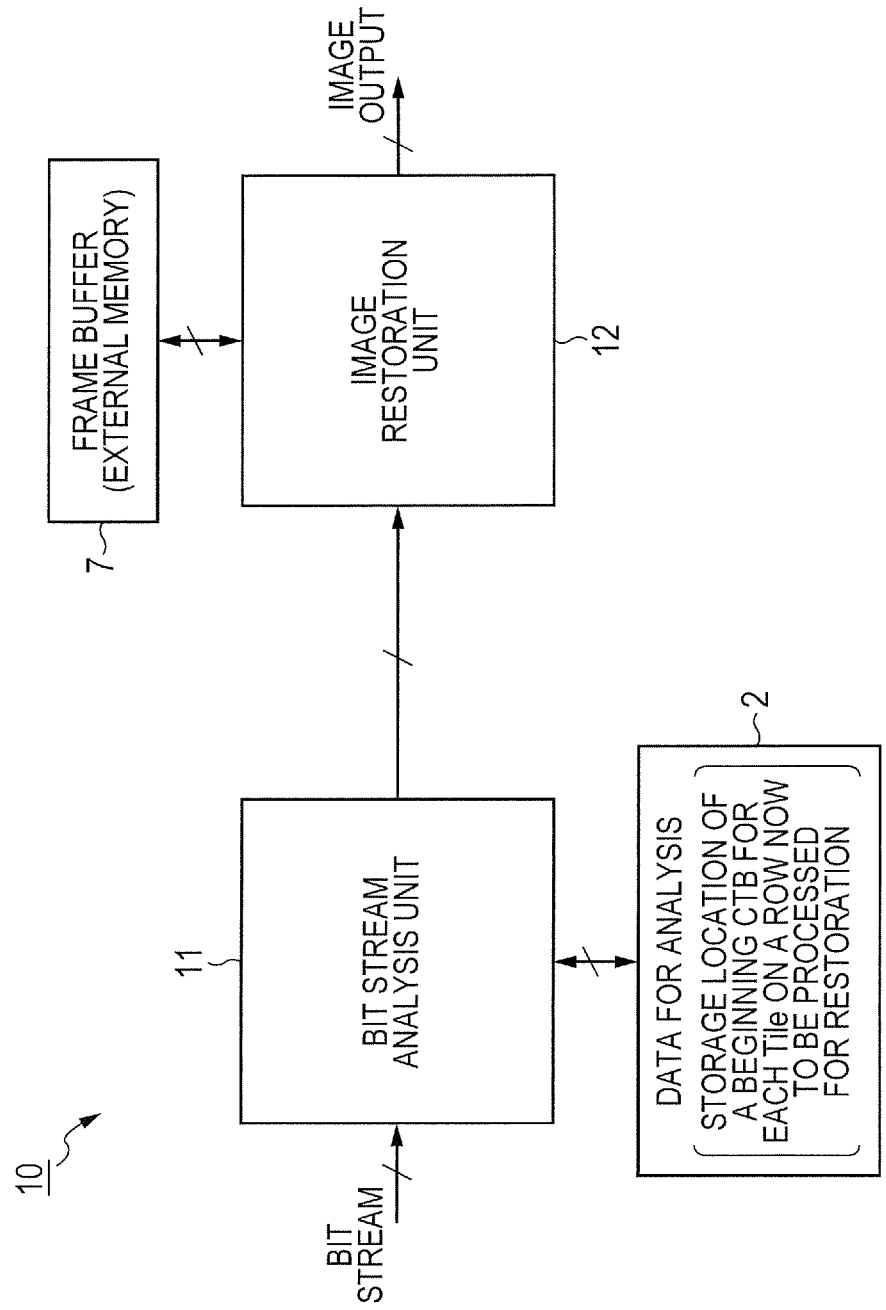
FIG. 7 is a block diagram depicting a configuration example of an image decoding apparatus pertaining to a second embodiment.

FIG. 7 is a block diagram depicting a configuration example of an image decoding apparatus 10 pertaining to a second embodiment.

The image decoding apparatus 10 pertaining to the second embodiment is configured including, a bit stream analysis unit 11 and an image restoration unit 12 and further including a data buffer for data for analysis 2 which is accessible from the bit stream analysis unit 11 and a frame buffer 7 which is accessible from the image restoration unit 12. The frame buffer 7 may be an external memory or may be configured in the same chip, together with the bit stream analysis unit 11 and the image restoration unit 12 comprised in the image decoding apparatus 10.

To the bit stream analysis unit 11, a bit stream is input that includes header information and coded image data. Based on header information within a bit stream, the bit stream analysis unit 11 calculates a location within a bit stream for a row now to be processed for restoration by the image restoration unit 12 and buffers that location into the data buffer for data for analysis 2. The location within a bit stream is a location at which is stored a coding block placed at the beginning of each tile. The bit stream analysis unit 11 reads the corresponding image data from a bit stream, based on the location at which is stored a coding block now to be processed for restoration, which is retained in the data buffer for data for analysis 2, and supplies that image data to the image restoration unit 12.

This configuration can eliminate the need for the abovementioned buffer for tile boundary filtering. To do so, instead, the data buffer for data for analysis is needed, but its size is less than or equal to a fraction of the size of the buffer for tile boundary filtering.

The size of the buffer for tile boundary filtering is calculated from the vertical width of a one-frame screen, in other words, the number of lines in a vertical direction. For example, if 16 bytes of pixel information and 2 bytes of filter information are required per line, 18,000 bytes will be present in 1000 lines. In contrast, required data for analysis is only as much as the number of tiles in a horizontal direction (the number of tiles into which a one-frame screen was divided in a horizontal direction)×4 bytes. For example, when the frame is divided into 3 tiles in a horizontal direction, the required data for analysis is 12 bytes. The size of the data buffer for data for analysis is determined by considering an assumed maximum value in the number of tiles in a horizontal direction. Even if it is assumed that the horizontal width of a one-frame screen is 2048 pixels, a CTB is formed of 8 pixels×8 pixels, and 1 CTB is formed of 1 tile, the number of tiles in a horizontal direction is 256 and required data for analysis is 1024 bytes. It is about an eighteenth part of 18,000 bytes, the size of the buffer for tile boundary filtering exemplified above. As above, the size of the data buffer for data for analysis can be reduced to be less than or equal to a fraction of the size of the buffer for tile boundary filtering.

Figure 8:
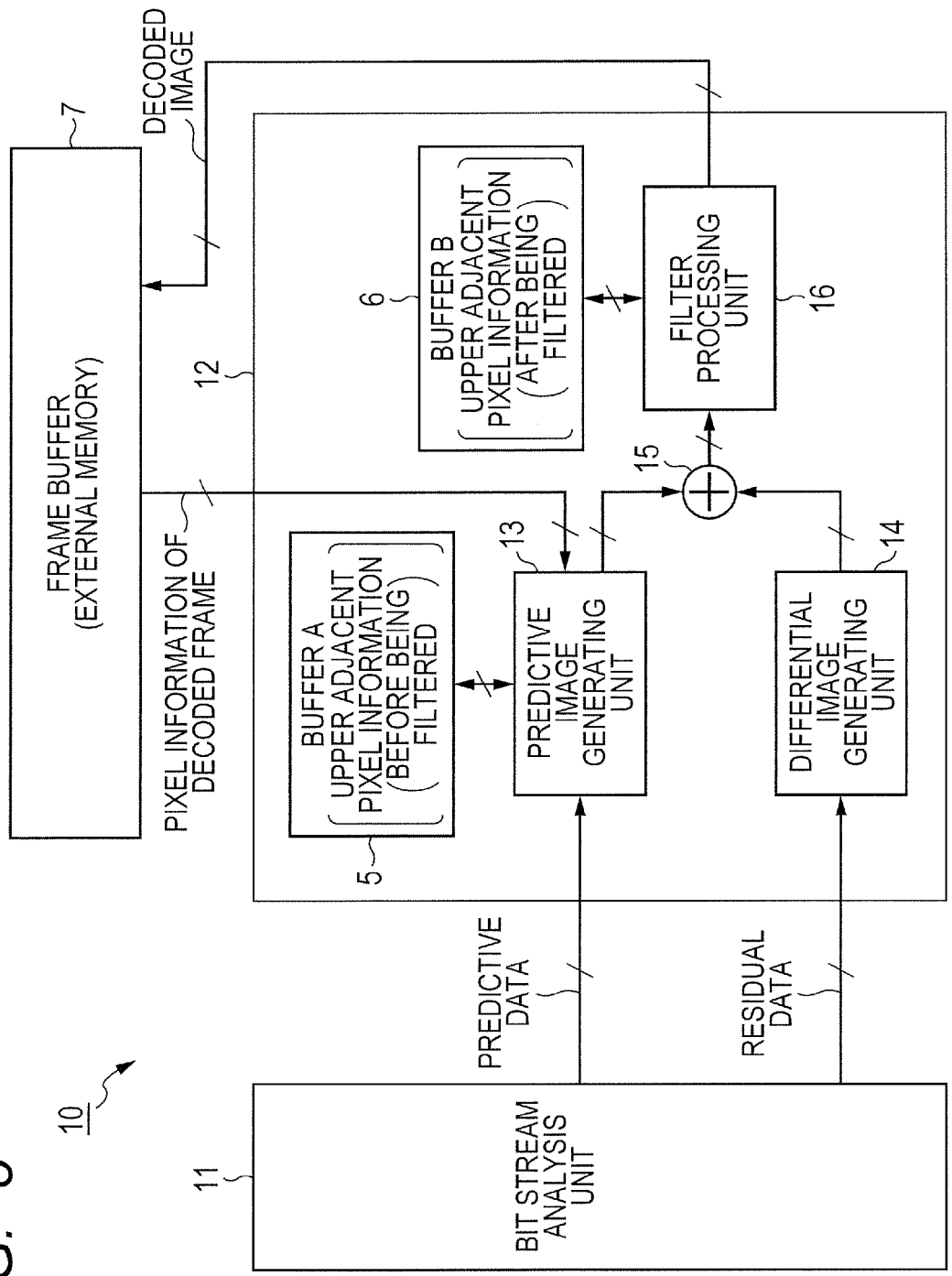
FIG. 8 is a block diagram depicting a detailed configuration example of, particularly, an image restoration unit in the image decoding apparatus in FIG. 7.

FIG. 8 is a block diagram depicting a detailed configuration example of, particularly, the image restoration unit 12 in the image decoding apparatus 10 in FIG. 7.

The image restoration unit 12 is configured including a predictive image generating unit 13, a differential image generating unit 14, an adder 15, a filter processing unit 16, a buffer A (5), and a buffer B (6). The buffer A (5) retains upper adjacent pixel information before being filtered, which is required for processing to generate a predictive image of a lower adjacent coding block to a coding block now being processed, among predictive image information that is output from the predictive image generating unit 13.

According to the H.265/HEVC standard, image data that is supplied from the bit stream analysis unit 11 is comprised of predictive data and residual data. The predictive image generating unit 13 generates a predictive image, based on predictive data comprised in image data which is supplied from the bit stream analysis unit 11, upper adjacent pixel information before being filtered, which is retained in the buffer A (5), and decoded pixel information which is stored in the frame buffer 7. The differential image generating unit 14 generates a differential image, based on residual data comprised in image data that is supplied from the bit stream analysis unit 11. The adder 15 adds the predictive image and the differential image and generates a decoded image before being filtered.

The buffer B (6) retains upper adjacent pixel information after being filtered, which is required for filter processing for a lower adjacent coding block to a coding block now being processed, among pixel information of a decoded image that is output from the filter processing unit 16. The filter processing unit 16 generates a decoded image, based on a decoded image before being filtered, which is supplied from the adder 15, and upper adjacent pixel information after being filtered, which is retained in the buffer B (6), and outputs the decoded image from the image restoration unit 12 to the frame buffer 7.

In this way, the image restoration unit 12 can be configured favorably. The buffer B (6) for storing upper adjacent pixel information after being filtered is coupled to the filter processing unit 16, but a buffer for storing left adjacent pixel information is not needed. This is because the image restoration unit 12 is configured such that a decoded image which is supplied from the adder 15 is directly input to the filter processing unit 16 and advances its processing in raster scan order independently of whether or not there is a tile boundary within one frame; thus, a decoded image of a left-hand tile is input to the filter processing 16 for a right-hand tile which is processed successively. Besides, because a pipeline configuration enables combining decode and filter processings for optimal execution, enhanced performance can be achieved.

Third Embodiment <A Buffer Provided at the Input Side of the Image Restoration Unit and Data Size of Each Tile>

Figure 9:
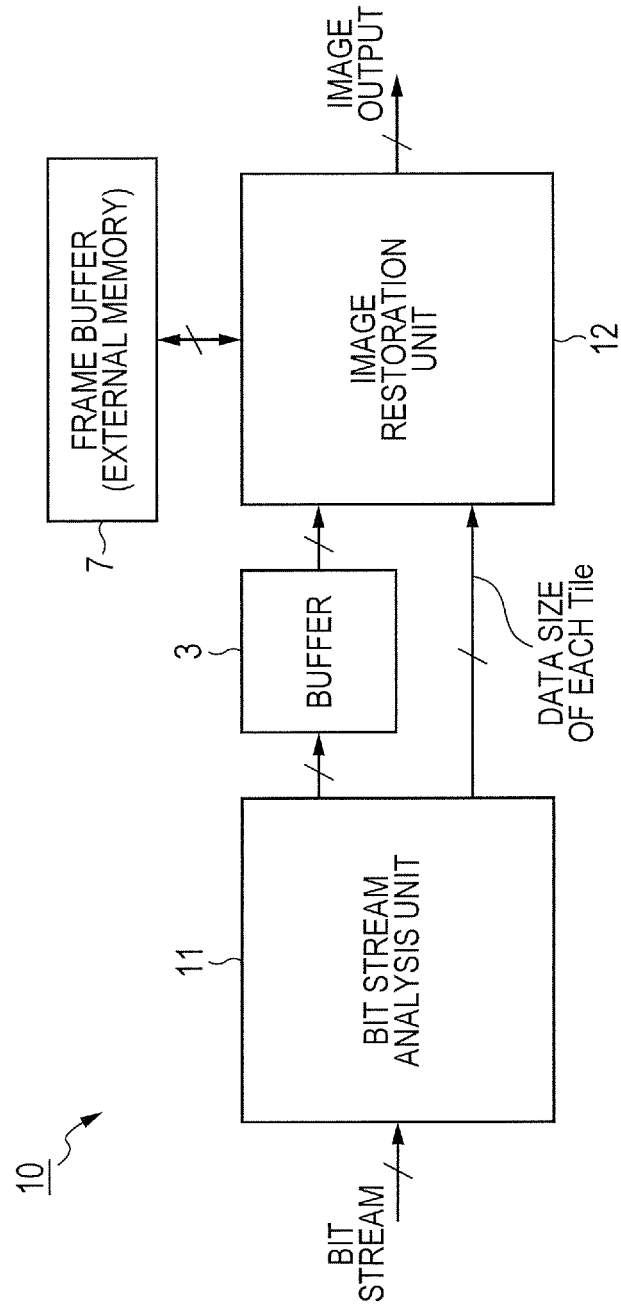
FIG. 9 is a block diagram depicting another configuration example of an image decoding apparatus pertaining to a third embodiment.

FIG. 9 is a block diagram depicting another configuration example of an image decoding apparatus 10 pertaining to a third embodiment.

The image decoding apparatus 10 pertaining to the third embodiment is configured including a bit stream analysis unit 11 and an image restoration unit 12 and further including an image data buffer 3 that temporarily stores coded image data which is output from the bit stream analysis unit 11 and a frame buffer 7 which is accessible from the image restoration unit 12. To the bit stream analysis unit 11, a bit stream is input that includes header information and coded image data. The bit stream analysis unit 11 outputs image data to the image data buffer 3, following the order in which image data is stored within a bit stream, calculates data size of each tile, based on header information within the bit stream, and outputs the data size of each tile to the image restoration unit 12. The order in which image data is stored within a bit stream is the raster scan order in which tiles are coded as well as the raster scan order within the range of each tile in which data within a tile is coded. The image restoration unit 12 calculates an address in the image data buffer 3 at which is stored image data now to be processed for decoding, based on data size of each tile which is input from the bit stream analysis unit 11, reads the image data from the image data buffer 3 according to that address, and decodes that image data.

This configuration can make the order in which to read and input image data to the image restoration unit 12 conforming to the order in which tiles and CTBs are to be processed, described with regard to the first embodiment, and can eliminate the need for the data buffer for data for analysis 2 in the second embodiment. Besides, because the bit stream analysis unit 11 processes a bit stream which has been input thereto sequentially from the beginning, it is possible to eliminate the need for data transfer which would occur if data is once saved to a memory and read again when processed.

Figure 10:
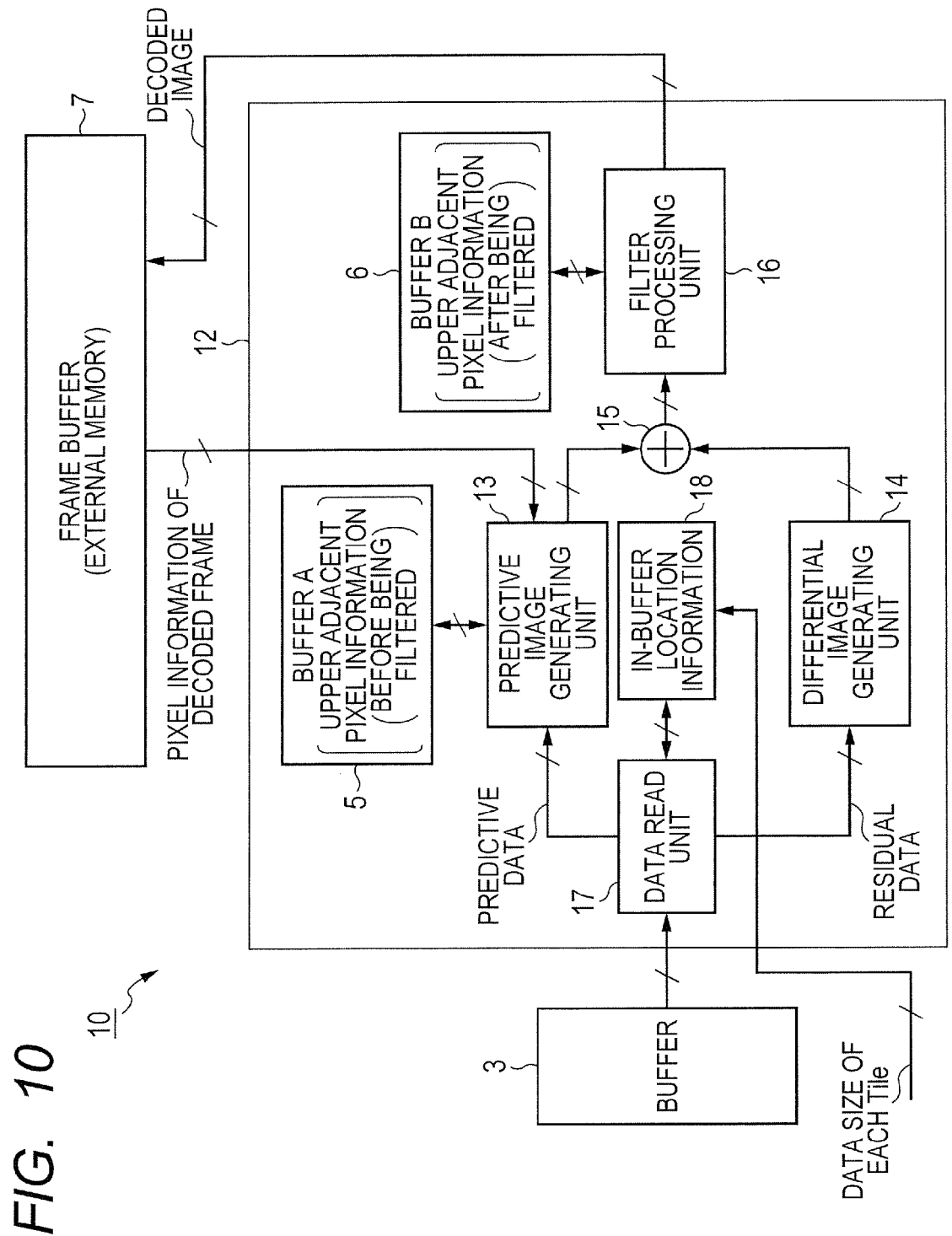
FIG. 10 is a block diagram depicting a detailed configuration example of, particularly, the image restoration unit in the image decoding apparatus in FIG. 9.

FIG. 10 is a block diagram depicting a detailed configuration example of, particularly, the image restoration unit 12 in the image decoding apparatus 10 in FIG. 9.

The image restoration unit 12 is configured including a data read unit 17, an in-buffer location information storing unit 18, a predictive image generating unit 13, a differential image generating unit 14, an adder 15, a filter processing unit 16, a buffer A (5), and a buffer B (6).

The in-buffer location information storing unit 18 retains an address in the image data buffer 3 at which is stored image data now to be processed for decoding, which is determined, based on data size of each tile which is input from the bit stream analysis unit 11. The data read unit 17 reads image data from the image data buffer 3 according to the address stored in the in-buffer location information storing unit 18, supplies predictive data comprised in the read image data to the predictive image generating unit 13, and supplies residual data comprised in the read image data to the differential image generating unit 14.

The buffer A (5) retains upper adjacent pixel information before being filtered, which is required for processing to generate a predictive image of a lower adjacent coding block to a coding block now being processed, among predictive image information that is output from the predictive image generating unit 13. The predictive image generating unit 13 generates a predictive image, based on predictive data which is supplied from the data read unit 17, upper adjacent pixel information before being filtered, which is retained in the buffer A (5), and decoded pixel information which is stored in the frame buffer 7. The differential image generating unit 14 generates a differential image, based on residual data which is supplied from the data read unit 17. The adder 15 adds the predictive image and the differential image and generates a decoded image before being filtered.

The buffer B (6) retains upper adjacent pixel information after being filtered, which is required for filter processing for a lower adjacent coding block to a coding block now being processed, among pixel information of a decoded image that is output from the filter processing unit 16. The filter processing unit 16 generates a decoded image, based on a decoded image before being filtered, which is supplied from the adder 15, and upper adjacent pixel information after being filtered, which is retained in the buffer B (6), and outputs the decoded image from the image restoration unit 12 to the frame buffer 7.

In this way, the image restoration unit 12 can be configured favorably, as is the case for the second embodiment. The buffer B (6) for storing upper adjacent pixel information after being filtered is coupled to the filter processing unit 16, but a buffer for storing left adjacent pixel information is not needed. This is because the image restoration unit 12 is configured such that a decoded image which is supplied from the adder 15 is directly input to the filter processing unit 16 and advances its processing in raster scan order independently of whether or not there is a tile boundary within one frame; thus, a decoded image of a left-hand tile is input to the filter processing 16 for a right-hand tile which is processed successively. Besides, because a pipeline configuration enables combining decode and filter processings for optimal execution, enhanced performance can be achieved.

Fourth Embodiment <Buffers for Respective Tiles Provided at the Input Side of the Image Restoration Unit>

Figure 11:
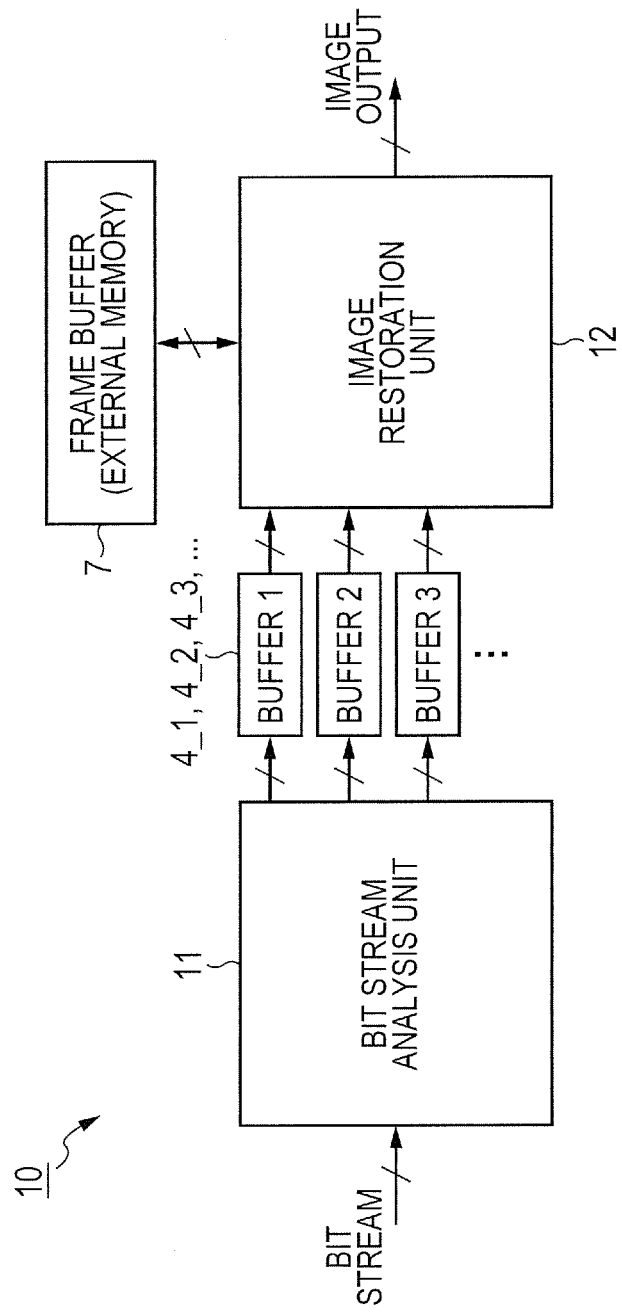
FIG. 11 is a block diagram depicting another configuration example of an image decoding apparatus pertaining to a fourth embodiment.

FIG. 11 is a block diagram depicting another configuration example of an image decoding apparatus 10 pertaining to a fourth embodiment.

The image decoding apparatus 10 pertaining to the fourth embodiment is configured including a bit stream analysis unit 11 and an image restoration unit 12 and further including a plurality of image data buffers (4_1, 4_2, 4_3, . . . ) that temporarily store coded image data which is output from the bit stream analysis unit 11 and supply that data to the image restoration unit 12 and a frame buffer 7 which is accessible from the image restoration unit 12. The image data buffers (4_1, 4_2, 4_3, . . . ) are used respectively for a plurality of tiles now to be processed for decoding. The bit stream analysis unit 11 outputs image data for a tile to any one of the image data buffers (4_1, 4_2, 4_3, . . . ) appropriate for that tile. The image restoration unit 12 reads image data from any one of the image data buffers (4_1, 4_2, 4_3, . . . ) in which is stored image data now to be processed for decoding and decodes that image data.

This configuration can make the order in which to read and input image data to the image restoration unit conforming to the order in which tiles and CTBs are to be processed, described with regard to the first embodiment, and can eliminate the need for the data buffer for data for analysis 2 in the second embodiment. Besides, because the bit stream analysis unit 11 processes a bit stream which has been input thereto sequentially from the beginning, it is possible to eliminate the need for data transfer which would occur if data is once saved to a memory and read again when processed.

Figure 12:
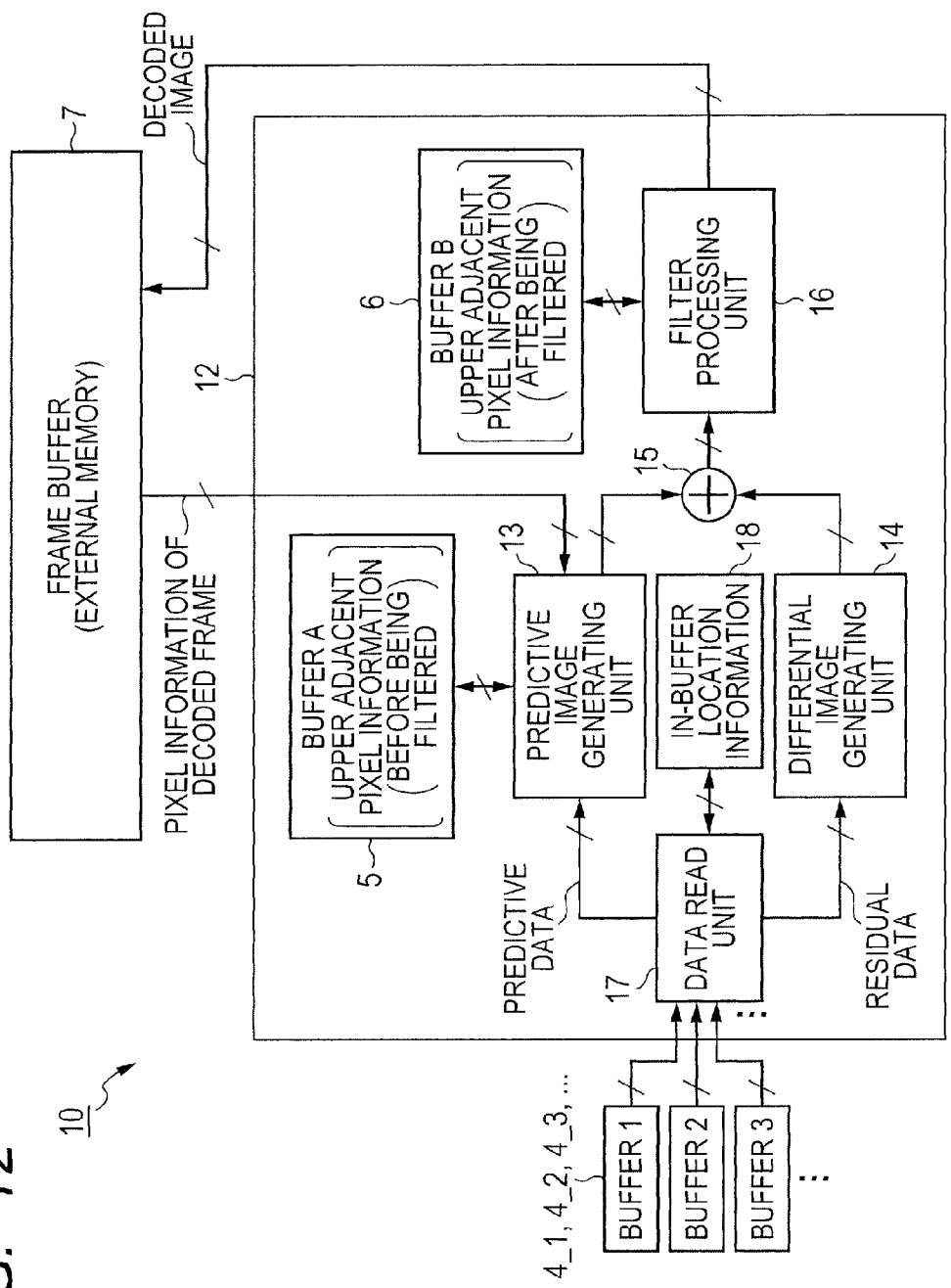
FIG. 12 is a block diagram depicting a detailed configuration example of, particularly, the image restoration unit in the image decoding apparatus in FIG. 11.

FIG. 12 is a block diagram depicting a detailed configuration example of, particularly, the image restoration unit 12 in the image decoding apparatus 10 in FIG. 11.

The image restoration unit 12 is configured including a data read unit 17, an in-buffer location information storing unit 18, a predictive image generating unit 13, a differential image generating unit 14, an adder 15, a filter processing unit 16, a buffer A (5), and a buffer B (6).

The in-buffer location information storing unit 18 retains an address at which is stored next image data now to be processed for decoding, which is determined, based on how much image data for each tile has already been read from one of the image data buffers (4_1, 4_2, 4_3, . . . ).

The data read unit 17 reads image data from any one of image data buffers (4_1, 4_2, 4_3, . . . ) used for a tile to which image data now to be processed for decoding belongs, according to the address stored in, the in-buffer location information storing unit 18, and supplies predictive data and residual data comprised in the read image data to the predictive image generating unit 13 and the differential image generating unit 14, respectively.

The buffer A (5) retains upper adjacent pixel information before being filtered, which is required for processing to generate a predictive image of a lower adjacent coding block to a coding block now being processed, among predictive image information that is output from the predictive image generating unit 13.

The predictive image generating unit 13 generates a predictive image, based on predictive data which is supplied from the data read unit 17, upper adjacent pixel information before being filtered, which is retained in the buffer A (5), and decoded pixel information which is stored in the frame buffer 7. The differential image generating unit 14 generates a differential image, based on residual data which is supplied from the data read unit 17. The adder 15 adds the predictive image and the differential image and generates a decoded image before being filtered.

The buffer B (6) retains upper adjacent pixel information after being filtered, which is required for filter processing for a lower adjacent coding block to a coding block now being processed, among pixel information of a decoded image that is output from the filter processing unit 16. The filter processing unit 16 generates a decoded image, based on a decoded image before being filtered, which is supplied from the adder 15, and upper adjacent pixel information after being filtered, which is retained in the buffer B (6), and outputs the decoded image from the image restoration unit 12 to the frame buffer 7.

In this way, the image restoration unit 12 can be configured favorably, as is the case for the second embodiment. The buffer B (6) for storing upper adjacent pixel information after being filtered is coupled to the filter processing unit 16, but a buffer for storing left adjacent pixel information is not needed. This is because the image restoration unit 12 is configured such that a decoded image which is supplied from the adder 15 is directly input to the filter processing unit 16 and advances its processing in raster scan order independently of whether or not there is a tile boundary within one frame; thus, a decoded image of a left-hand tile is input to the filter processing 16 for a right-hand tile which is processed successively. Besides, because a pipeline configuration enables combining decode and filter processings for optimal execution, enhanced performance can be achieved.

Fourth Embodiment <A Buffer for Storing Fixed-Length Data Provided at the Input Side of the Image Restoration Unit>

Figure 13:
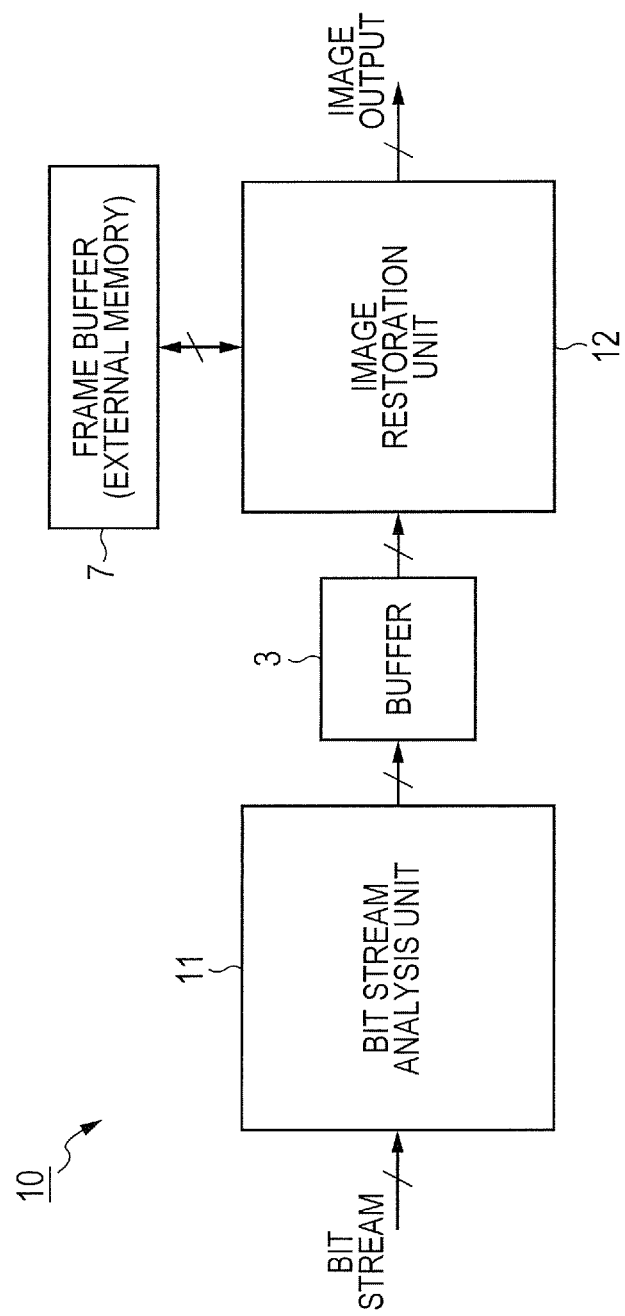
FIG. 13 is a block diagram depicting another configuration example of an image decoding apparatus pertaining to a fifth embodiment.

FIG. 13 is a block diagram depicting another configuration example of an image decoding apparatus 10 pertaining to a fifth embodiment.

The image decoding apparatus 10 pertaining to the fifth embodiment is configured including a bit stream analysis unit 11 and an image restoration unit 12 and further including an image data buffer 3 that temporarily stores coded image data which is output from the bit stream analysis unit 11 and supplies that data to the image restoration unit 12 and a frame buffer 7 which is accessible from the image restoration unit 12.

The bit stream analysis unit 11 converts data size of each tile of image data to data size of a given fixed length, following the order in which image data is stored within a bit stream, and outputs image data of fixed length to the image data buffer 3. Based on the above data size of a given fixed length, the image restoration unit 12 calculates an address at which is stored image data now to be processed for decoding, reads the image data from the image data buffer 3, and decodes that image data.

In the third embodiment, the bit stream analysis unit 11 outputs image data in which data size of each tile is variable length as stored within a bit stream to the image data buffer 3. Hence, it is needed to know the size of each tile to calculate an address at which is stored image data placed at the beginning of each tile on each row. Hence, the bit stream analysis unit 11 obtains the data size of each tile from header information in a bit stream and supplies it to the image restoration unit 12.

On the other hand, in the fifth embodiment, the bit stream analysis unit 11 converts data size of each tile of image data to data size of a given fixed length and outputs image data of fixed length to the image data buffer 3. Thus, the image restoration unit 12 can calculate an address at which is stored image data placed at the beginning of each tile on each row, based on the above data size of a given fixed length, without having to know the data size of each tile, respectively, in a bit stream.

This configuration as described above can make the order in which to read and input image data to the image restoration unit 12 conforming to the order in which tiles and CTBs are to be processed, described with regard to the first embodiment, without supplying data size of each tile from the bit stream analysis unit 11 to the image restoration unit 12, and can eliminate the need for the data buffer for data for analysis 2 in the second embodiment. Besides, because the bit stream analysis unit 11 processes a bit stream which has been input thereto sequentially from the beginning, it is possible to eliminate the need for data transfer which would occur if data is once saved to a memory and read again when processed.

Figure 14:
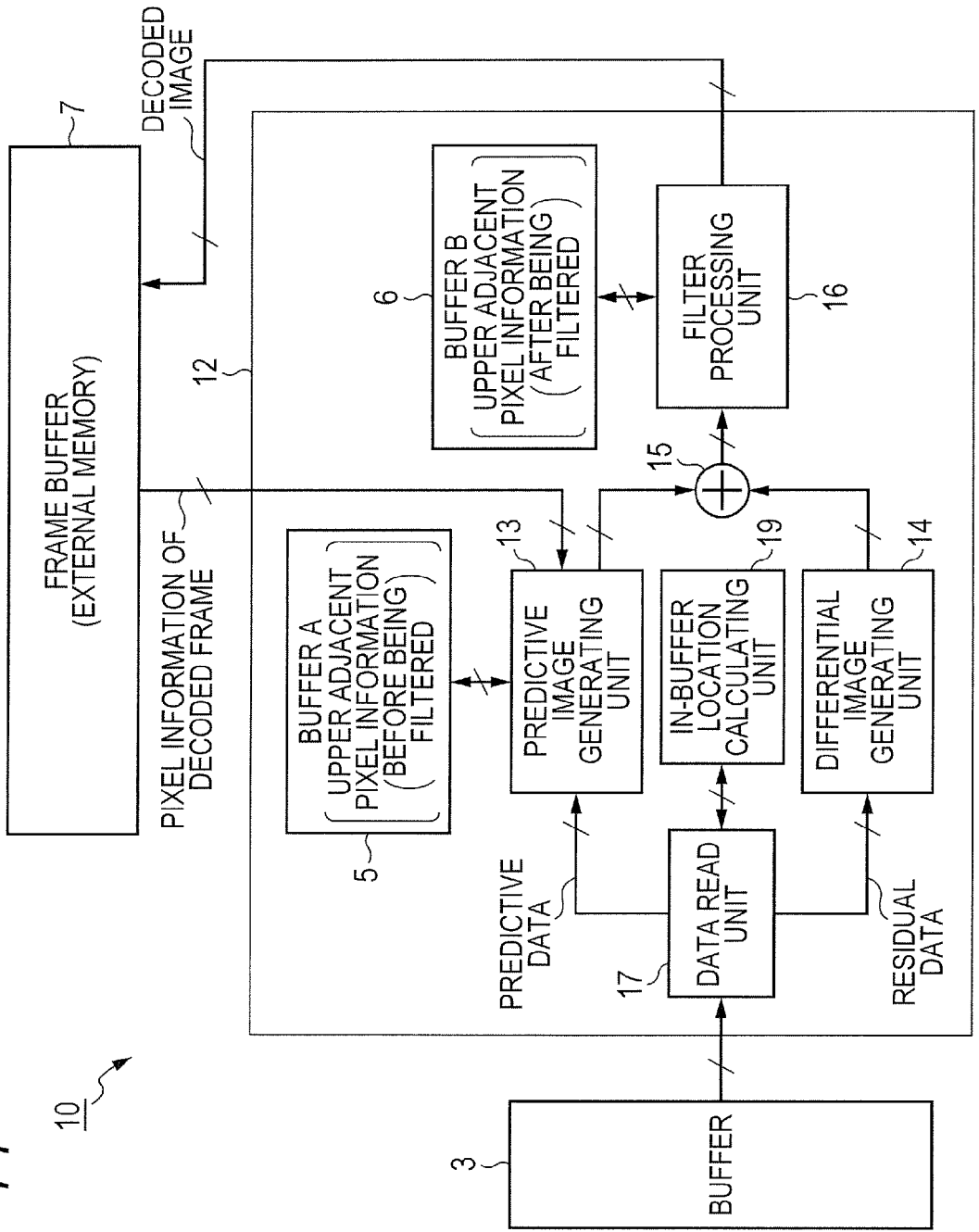
FIG. 14 is a block diagram depicting a detailed configuration example of, particularly, the image restoration unit in the image decoding apparatus in FIG. 13.

FIG. 14 is a block diagram depicting a detailed configuration example of, particularly, the image restoration unit 12 in the image decoding apparatus 10 in FIG. 13.

The image restoration unit 12 is configured including a data read unit 17, an in-buffer location calculating unit 19, a predictive image generating unit 13, a differential image generating unit 14, an adder 15, a filter processing unit 16, a buffer A (5), and a buffer B (6).

The in-buffer location calculating unit 19 calculates an address in the image data buffer 3 at which is stored image data now to be processed for decoding, based on the above-mentioned data size of a given fixed length. The data read unit 17 reads image data from the image data buffer 3 according to the address calculated by the in-buffer location calculating unit 19, supplies predictive data comprised in the read image data to the predictive image generating unit 13, and supplies residual data comprised in the read image data to the differential image generating unit 14.

The buffer A (5) retains upper adjacent pixel information before being filtered, which is required for processing to generate a predictive image of a lower adjacent coding block to a coding block now being processed, among predictive image information that is output from the predictive image generating unit 13. The predictive image generating unit 13 generates a predictive image, based on predictive data which is supplied from the data read unit 17, upper adjacent pixel information before being filtered, which is retained in the buffer A (5), and decoded pixel information which is stored in the frame buffer 7. The differential image generating unit 14 generates a differential image, based on residual data which is supplied from the data read unit 17. The adder 15 adds the predictive image and the differential image and generates a decoded image before being filtered.

The buffer B (6) retains upper adjacent pixel information after being filtered, which is required for filter processing for a lower adjacent coding block to a coding block now being processed, among pixel information of a decoded image that is output from the filter processing unit 16. The filter processing unit 16 generates a decoded image, based on a decoded image before being filtered, which is supplied from the adder 15, and upper adjacent pixel information after being filtered, which is retained in the buffer B (6), and outputs the decoded image from the image restoration unit 12 to the frame buffer 7.

In this way, the image restoration unit 12 can be configured favorably, as is the case for the second embodiment. The buffer B (6) for storing upper adjacent pixel information after being filtered is coupled to the filter processing unit 16, but a buffer for storing left adjacent pixel information is not needed. This is because the image restoration unit 12 is configured such that a decoded image which is supplied from the adder 15 is directly input to the filter processing unit 16 and advances its processing in raster scan order independently of whether or not there is a tile boundary within one frame; thus, a decoded image of a left-hand tile is input to the filter processing 16 for a right-hand tile which is processed successively. Besides, because a pipeline configuration enables combining decode and filter processings for optimal execution, enhanced performance can be achieved. Besides, it is possible to eliminate the need for supplying data size of each tile from the bit stream analysis unit 11 to the image restoration unit 12, which is required in the third embodiment.

While the invention made by the present inventors has been described specifically based on its embodiments hereinbefore, it will be obvious that the present invention is not limited to the described embodiments and various modifications may be made therein without departing from the scope of the invention.

What is claimed is:
1. An image decoding apparatus comprising:
a bit stream analysis circuitry to which a bit stream comprising header information and coded image data is input; and
an image restoration circuitry that executes decode processing on the coded image data which is supplied from the bit stream analysis circuitry and executes filter processing on decoded data resulting from the decode processing,
wherein the coded image data is image data obtained by dividing one frame of an original image into a plurality of tiles which are rectangular regions and coding each of the tiles, each of the tiles comprising one or more coding blocks which are units of coding, arranged in a matrix,
wherein the bit stream includes the coded image data coded for each tile in order from a tile on the left end, top row within the one frame, going through a right adjacent tile in turn, followed by tiles on one row down from left to right sequentially, and up to the bottom row in the frame, and coded for each coding block in each tile in order from a coding block on the left end, top row within the tile, going through a right adjacent coding block in turn, followed by coding blocks on one row down from left to right sequentially, and up to the bottom row in the tile,
wherein the header information includes size information for each of the tiles,
wherein the image restoration circuitry serially executes decoding coding blocks in order from a coding block on the left end, top row within the one frame, going through a right adjacent coding block in turn, followed by coding blocks on one row down from left to right sequentially, and up to the bottom row in the frame, independently of whether or not there is a tile boundary within the one frame, and filtering decoded image data around a boundary between horizontally adjoining tiles,
wherein the image decoding apparatus further comprises an image data buffer that temporarily stores the coded image data which is output from the bit stream analysis circuitry and supplies that data to the image restoration circuitry,
wherein the bit stream analysis circuitry outputs the image data to the image data buffer, following an order in which image data is stored within the bit stream, calculates data size of each tile, based on the header information, and outputs the data size of each tile to the image restoration circuitry,
wherein the image restoration circuitry calculates an address at which is stored image data now to be processed for decoding, based on the data size of each tile, reads the image data from the image data buffer, and decodes that image data,
wherein the image decoding apparatus further comprises a frame buffer for storing decoded images that are output from the image restoration circuitry,
wherein the image restoration circuitry comprises a data read circuitry, an in-buffer location information storing circuitry, a predictive image generating circuitry, a differential image generating circuitry, an adder, a filter processing circuitry, a first buffer, and a second buffer,
wherein the in-buffer location information storing circuitry retains the address at which is stored image data now to be processed for decoding, which is determined, based on the data size of each tile,
wherein the data read circuitry reads image data from the image data buffer according to the address stored in the in-buffer location information storing circuitry, supplies predictive data comprised in the read image data to the predictive image generating circuitry, and supplies residual data comprised in the read image data to the differential image generating circuitry,
wherein the first buffer retains upper adjacent pixel information before being filtered, which is required for processing to generate a predictive image of a lower adjacent coding block to a coding block now being processed, among predictive image information that is output from the predictive image generating circuitry,
wherein the predictive image generating circuitry generates a predictive image, based on the predictive data which is supplied from the data read circuitry, the upper adjacent pixel information before being filtered, which is retained in the first buffer, and decoded pixel information which is stored in the frame buffer,
wherein the differential image generating circuitry generates a differential image, based on the residual data which is supplied from the data read circuitry,
wherein the adder adds the predictive image and the differential image and generates a decoded image before being filtered,
wherein the second buffer retains upper adjacent pixel information after being filtered, which is required for filter processing for a lower adjacent coding block to a coding block now being processed, among pixel information of a decoded image that is output from the filter processing circuitry, and wherein the filter processing circuitry generates a decoded image, based on the decoded image before being filtered, which is supplied from the adder, and the upper adjacent pixel information after being filtered, which is retained in the second buffer, and outputs the decoded image from the image restoration circuitry.

2. The image decoding apparatus according to claim 1,
wherein the image restoration circuitry executes decoding and filtering successively for a row, and
wherein, across a tile boundary, decoded results of a left-hand tile are directly passed to the filter processing for a right-hand tile.

3. The image decoding apparatus according to claim 1,
wherein the image restoration circuitry executes decoding and filtering successively for a row, and
wherein, across a tile boundary, a result decoded results of a left-hand tile are used in the filter processing for a right-hand tile which is processed successively.

4. An image decoding apparatus that executes decode processing on coded image data obtained by dividing one frame of an original image into a plurality of tiles which are rectangular regions, each of the tiles comprising one or more coding blocks which are units of coding, arranged in a matrix, the image decoding apparatus comprising:
a bit stream analysis circuitry that inputs a bit stream including size information for each of the tiles and the coded image data coded for each tile in order from a tile on the left end, top row within the one frame, going through a right adjacent tile in turn, followed by tiles on one row down from left to right sequentially, and up to the bottom row in the frame, and coded for each coding block in each tile in order from a coding block on the left end, top row within the tile, going through a right adjacent coding block in turn, followed by coding blocks on one row down from left to right sequentially, and up to the bottom row in the tile;
an image data buffer that is coupled to the bit stream analysis circuitry, and that stores the coded image data, following an order in which the coded image data is stored within the bit stream; and
an image restoration circuitry that is coupled to the bit stream analysis circuitry and the image data buffer, that reads, according to an address calculated based on the size information of each tile, from the image data buffer, the coded image data to be processed for decoding in order from a coding block on the left end, top row within the one frame, going through a right adjacent coding block in turn, followed by coding blocks on one row down from left to right sequentially, and up to the bottom row in the frame, independently of whether or not there is a tile boundary within the one frame, to execute the decode processing on the read image data, and that executes the filter processing on decoded image data around a tile boundary between horizontally adjoining tiles,
wherein the image restoration circuitry executes the decode processing and the filter processing successively for a row and uses, across the tile boundary, results of the decode processing of a left-hand tile in the filter processing for a right-hand tile which is processed successively, wherein the image restoration circuitry comprises:
an in-buffer location information storing circuitry that retains the address;
a data read circuitry that is coupled to the image data buffer and the in-buffer location information storing circuitry, and that reads the coded image data to be processed for decoding according to the address to output predictive data and residual data comprised in the read image data;
a first buffer that retains upper adjacent pixel information before being filtered;
a predictive image generating circuitry that is coupled to the data read circuitry and the first buffer, and that generates a predictive image based on the predictive data and the upper adjacent pixel information before being filtered;
a differential image generating circuitry that is coupled to the data read circuitry, and that generates a differential image based on the residual data;
an adder that is coupled to the predictive image generating circuitry and the differential image generating circuitry, and that adds the predictive image and the differential image to generate a decoded image before being filtered;
a second buffer that retains upper adjacent pixel information after being filtered; and
a filter processing circuitry that is coupled to the adder and the second buffer, and that generates a decoded image based on the decoded image before being filtered and the upper adjacent pixel information after being filtered,
wherein the upper adjacent pixel information before being filtered is required for processing to generate a predictive image of a lower adjacent coding block to a coding block being processed, among pixel information of the predictive image,
wherein the upper adjacent pixel information after being filtered is required for filter processing for a lower adjacent coding block to a coding block being processed, among pixel information of the decoded image.

5. The image decoding apparatus according to claim 4, further comprising a frame buffer that is coupled to the image restoration circuitry, and that stores the decoded image,
wherein the predictive image generating circuitry generates the predictive image based on the predictive data, the upper adjacent pixel information before being filtered, and pixel information of the decoded image which is stored in the frame buffer.

6. A decode processing method of an image decoding apparatus that includes an image data buffer for storing coded image data and that executes decode processing on the coded image data obtained by dividing one frame of an original image into a plurality of tiles which are rectangular regions, each of the tiles comprising one or more coding blocks which are units of coding, arranged in a matrix, the decode processing method comprising:
inputting a bit stream including size information of each of the tiles and the coded image data coded for each tile in order from a tile on the left end, top row within the one frame, going through a right adjacent tile in turn, followed by tiles on one row down from left to right sequentially, and up to the bottom row in the frame, and coded for each coding block in each tile in order from a coding block on the left end, top row within the tile, going through a right adjacent coding block in turn, followed by coding blocks on one row down from left to right sequentially, and up to the bottom row in the tile;

storing the coded image data, following an order in which the coded image data is stored within the bit stream, into the image data buffer;

calculating, based on the size information of each tile, an address for reading the coded image data to be processed for decoding from the image data buffer;

reading, according to the address, from the image data buffer, the coded image data to be processed for decoding in order from a coding block on the left end, top row within the one frame, going through a right adjacent coding block in turn, followed by coding blocks on one row down from left to right sequentially, and up to the bottom vow in the frame, independently of whether or not there is a tile boundary within the one frame;

executing the decode processing on the read image data; and executing the filter processing on decoded image data around a tile boundary between horizontally adjoining tiles, wherein the decode processing, and the filter processing for a row are successively executed, wherein, across the tile boundary, results of the decode processing of a left-hand tile are used in the filter processing for a right-hand tile which is processed successively, wherein the step of executing the decode processing comprises:

generating a predictive image based on predictive data and upper adjacent pixel information before being filtered, the predictive data being included in the coded image data to be processed for decoding which is read from the image data buffer;

generating a differential image based on residual data which is included in the coded image data to be processed for decoding which is read from the image data buffer; and adding the predictive image and the differential image to generate a decoded image before being filtered, wherein the step of executing the filter processing comprises generating a decoded image based on the decoded image before being filtered and upper adjacent pixel information after being filtered, wherein the upper adjacent pixel information before being filtered is required for processing to generate a predictive image of a lower adjacent coding block to a coding block being processed, among pixel information of the predictive image, wherein the upper adjacent pixel information after being filtered is required for filter processing for a lower adjacent coding block to a coding block being processed, among pixel information of the decoded image.

7. The decode processing method according to claim 6, further comprising storing the decoded image into a frame buffer, wherein the step of generating the predictive image comprises generating the predictive image based on the predictive data, the upper adjacent pixel information before being filtered and pixel information of the decoded image which is stored in the frame buffer.

* * * * *